US012634663B2

(12) United States Patent
Xu et al.

(10) Patent No.: US 12,634,663 B2
(45) Date of Patent: May 19, 2026

(54) METHOD AND APPARATUS FOR DYNAMIC GROUP MANAGEMENT

(71) Applicant: Telefonaktiebolaget LM Ericsson (publ), Stockholm (SE)

(72) Inventors: Wenliang Xu, Shanghai (CN); Ali El Essaili, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 424 days.

(21) Appl. No.: 17/758,294

(22) PCT Filed: Dec. 18, 2020

(86) PCT No.: PCT/CN2020/137685
§ 371 (c)(1),
(2) Date: Jun. 30, 2022

(87) PCT Pub. No.: WO2021/139509
PCT Pub. Date: Jul. 15, 2021

(65) Prior Publication Data
US 2023/0039024 A1 Feb. 9, 2023

(51) Int. Cl.
*H04W 4/08* (2009.01)
*H04W 4/40* (2018.01)
(52) U.S. Cl.
CPC ............... *H04W 4/08* (2013.01); *H04W 4/40* (2018.02)
(58) Field of Classification Search
CPC .......... H04W 4/08; H04W 4/40; H04W 8/186
See application file for complete search history.

(56) References Cited

U.S. PATENT DOCUMENTS 6,671,695 B2 * 12/2003 McFadden ............ G06F 16/288
707/804
2008/0045192 A1 2/2008 Zhao et al.
(Continued)

FOREIGN PATENT DOCUMENTS

| CN | 101127941 A | 2/2008 |
| CN | 104854916 A | 8/2015 |
| CN | 107040995 A | 8/2017 |

OTHER PUBLICATIONS

3GPP TS 23.434 V16.2.0, "3rd Generation Partnership Project; Technical Specification Group Services and System Aspects; Service Enabler Architecture Layer for Verticals (SEAL); Functional architecture and information flows; (Release 16)," Dec. 2019, 119 pages, 3GPP Organizational Partners.
(Continued)

*Primary Examiner* — Yuwen Pan
*Assistant Examiner* — Fatuma G Sherif
(74) *Attorney, Agent, or Firm* — Nicholson De Vos Webster & Elliott LLP

(57) ABSTRACT

A method for dynamic group management. The method which may be performed by a vertical application layer server comprises receiving first dynamic information for a group of communication devices from a group management server. The method further comprises transmitting second dynamic information for the group of communication devices to an application specific server, based at least in part on the first dynamic information for the group of communication devices. In some instances, the application specific server may get the dynamic information about group membership effectively during dynamic group management.

9 Claims, 19 Drawing Sheets

(56) References Cited

U.S. PATENT DOCUMENTS

| | | | |
|---|---|---|---|
| 2008/0263207 A1* | 10/2008 | Popescu | H04L 12/185 |
| | | | 709/226 |
| 2017/0142691 A1 | 5/2017 | Sirotkin | |
| 2019/0349719 A1* | 11/2019 | Pattan | H04W 4/40 |
| 2021/0007178 A1* | 1/2021 | Pattan | H04W 76/11 |

OTHER PUBLICATIONS

European Search Report and Search Opinion, EP App. No. 20912422.1, May 23, 2023, 8 pages.
First Office Action, CN App. No. 202080090897.5, May 25, 2023, 10 pages (4 pages of English Translation and 6 pages of Original Document).
Samsung, "Pseudo-CR on group procedures," May 20-24, 2019, 4 pages, 3GPP TSG-SA WG6 Meeting #31, S6-191121, Bruges, Belgium.
Communication pursuant to Article 94(3) EPC, EP App. No. 20912422.1, Jun. 7, 2024, 5 pages.
Decision to Grant, CN App. No. 202080090897.5, Mar. 21, 2024, 3 pages (2 pages of English Translation and 1 page of Original Document).
Examination Report, IN App. No. 202217038406, Apr. 25, 2024, 7 pages.

Second Office Action, CN App. No. 202080090897.5, Oct. 27, 2023, 8 pages of Original Document Only.
International Preliminary Report on Patentability for Application No. PCT/CN2020/137685, Jul. 21, 2022, 7 pages.
International Search Report and Written Opinion for Application No. PCT/CN2020/137685, Mar. 9, 2021, 10 pages.
3GPP TS 23.286 V16.1.0, "3rd Generation Partnership Project; Technical Specification Group Services and System Aspects; Application layer support for Vehicle-to-Everything (V2X) services; Functional architecture and information lows; (Release 16)," Sep. 2019, 59 pages, 3GPP Organizational Partners.
3GPP TS 23.434 V16.1.0, "3rd Generation Partnership Project; Technical Specification Group Services and System Aspects; Service Enabler Architecture Layer for Verticals (SEAL); Functional architecture and information flows; (Release 16)," Sep. 2019, 117 pages, 3GPP Organizational Partners.
Samsung, "Pseudo-CR on V2X dynamic group management", Apr. 8-12, 2019, 4 pages, 3GPP TSG-SA WG6 Meeting #30, S6-190762, Newport Beach, CA, USA.
Huawei et al., "Correction to push layer-2 group ID mapping information flow", Jul. 8-12, 2019, 2 pages, 3GPP TSG-SA WG6 Meeting #32, S6-191474, Roma, Italy.
Ericsson, "Correct Group Management procedure", Jan. 13-17, 2020, 4 pages, 3GPP TSG-SA WG6 Meeting #35, S6-200078, Hyderabad, India.

* cited by examiner

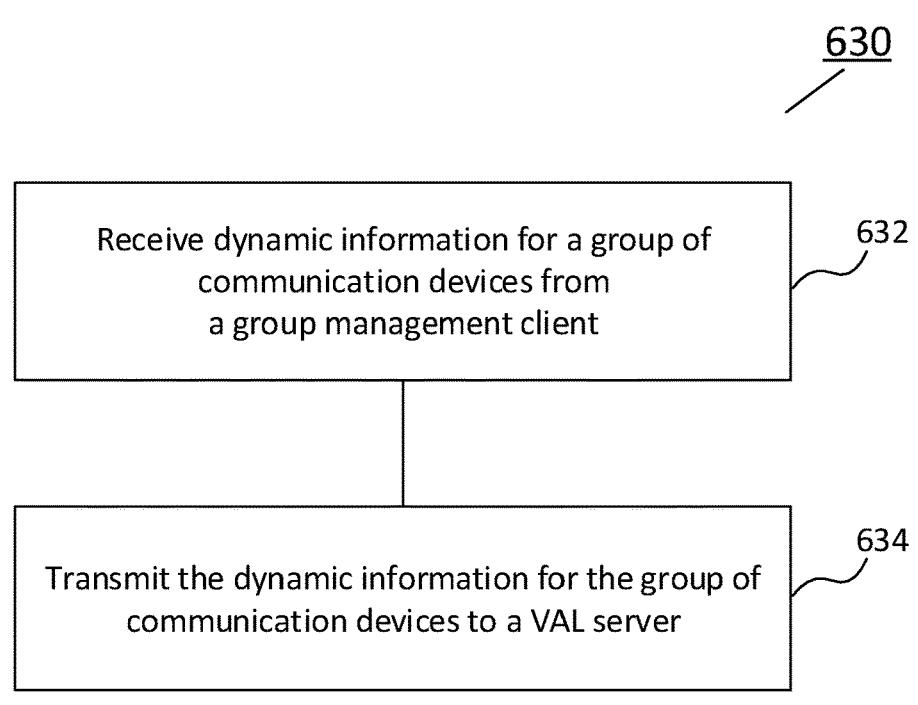

630

Receive dynamic information for a group of communication devices from a group management client    632

Transmit the dynamic information for the group of communication devices to a VAL server    634

Fig.6C

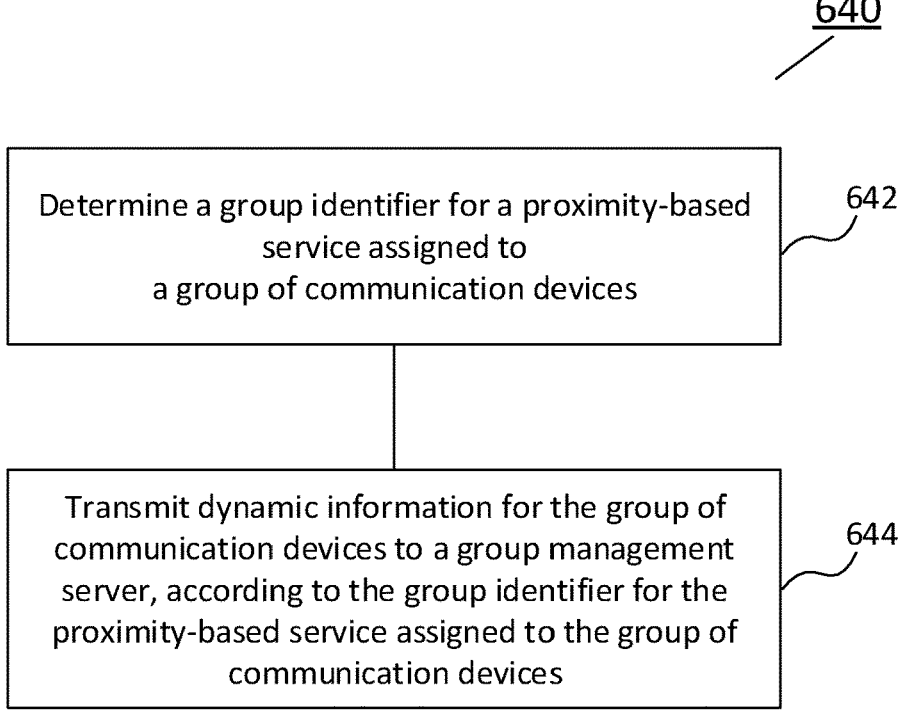

640

Determine a group identifier for a proximity-based service assigned to a group of communication devices    642

Transmit dynamic information for the group of communication devices to a group management server, according to the group identifier for the proximity-based service assigned to the group of communication devices    644

Fig.6D

METHOD AND APPARATUS FOR DYNAMIC GROUP MANAGEMENT

CROSS-REFERENCE TO RELATED APPLICATIONS

This application is a National stage of International Application No. PCT/CN2020/137685, filed Dec. 18, 2020, which claims priority to International Application No. PCT/CN2020/070460, filed Jan. 6, 2020, which are hereby incorporated by reference.

FIELD OF THE INVENTION

The present disclosure generally relates to communication networks, and more specifically, to a method and apparatus for dynamic group management.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the evolution of wireless communication, a requirement for supporting device-to-device (D2D) communication features in various applications is proposed. An extension for the D2D work may consist of supporting vehicle-to-everything (V2X) or intelligent transport system (ITS) communications, which may include any combination of direct communications among vehicles, pedestrians and infrastructure. Wireless communication networks such as long-term evolution (LTE) and new radio (NR) networks may be expected to use V2X services and support communications for V2X capable user equipment (UE).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network, V2X services may be used by various applications to meet different communication requirements. In some V2X scenarios, V2X capable UEs (also called V2X UEs for short) may support group-based communication for a specific application such as platooning, cooperative driving, dynamic ride sharing, etc. The group-based communication may be received by the V2X UEs which are configured as members of a dynamic group established for this specific application. During operations for the group-based communication, some group parameters (e.g., a group identifier (ID), UE IDs, etc.) may need to be updated dynamically and communicated between the V2X UEs and a V2X application specific server to manage this dynamic group. However, the existing communication procedures do not support notifications about dynamic group information to the V2X application specific server. Therefore, it may be desirable to implement dynamic group management in an efficient way.

Various exemplary embodiments of the present disclosure propose a solution for dynamic group management, which can enable a V2X application specific server to be aware of dynamic group information (e.g., information about group member join/leave, etc.) from a vertical application layer (VAL) server (e.g., a V2X application enabler (VAE) server which may be configured to support service enabler architecture layer for verticals (SEAL) interaction), so as to optimize notification mechanisms for dynamic group management.

According to a first aspect of the present disclosure, there is provided a method performed by a VAL server. The method comprises receiving first dynamic information for a group of communication devices from a group management server. The method further comprises transmitting second dynamic information for the group of communication devices to an application specific server, based at least in part on the first dynamic information for the group of communication devices.

In accordance with some exemplary embodiments, the first dynamic information for the group of communication devices may comprise at least one of:

a VAL group identifier of the group of communication devices;

a list of identifiers of one or more members newly joined the group of communication devices; and a list of identifiers of one or more members newly left the group of communication devices.

In accordance with some exemplary embodiments, the second dynamic information for the group of communication devices may comprise at least one of:

a dynamic group identifier of the group of communication devices;

a list of identifiers of one or more members newly joined the group of communication devices; and a list of identifiers of one or more members newly left the group of communication devices.

In accordance with some exemplary embodiments, the VAL server may configure the group of communication devices, in response to receiving a first request for configuring the group of communication devices from the application specific server. The first request may include information about a first end point to which a notification related to the group of communication devices is to be sent.

In accordance with some exemplary embodiments, the first end point may comprise the application specific server or any other suitable functional entity.

In accordance with some exemplary embodiments, the configuration of the group of communication devices by the VAL server may comprise: transmitting a second request for configuring the group of communication devices to the group management server, according to the first request received from the application specific server; and receiving a response to the second request from the group management server.

In accordance with some exemplary embodiments, the second request may include a group identifier for a proximity-based service assigned to the group of communication devices.

In accordance with some exemplary embodiments, the second request may include information about a second end point to which a notification related to the group of communication devices is to be sent.

In accordance with some exemplary embodiments, the configuration of the group of communication devices by the VAL server may further comprise: transmitting a response to the first request to the application specific server, according to the response to the second request received from the group management server.

According to a second aspect of the present disclosure, there is provided an apparatus which may be implemented as a VAL server. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a VAL server. The apparatus may comprise a receiving unit and a transmitting unit. In accordance with some exemplary embodiments, the receiving unit may be operable to carry out at least the receiving step of the method according to the first aspect of the present disclosure. The transmitting unit may be operable to carry out at least the transmitting step of the method according to the first aspect of the present disclosure.

According to a fifth aspect of the present disclosure, there is provided a method performed by an application specific server. The method comprises receiving second dynamic information for a group of communication devices from a VAL server. The second dynamic information may be based at least in part on first dynamic information for the group of communication devices transmitted from a group management server to the VAL server.

In accordance with some exemplary embodiments, the first and second dynamic information described in connection with the method according to the fifth aspect of the present disclosure may respectively correspond to the first and second dynamic information described in connection with the method according to the first aspect of the present disclosure.

In accordance with some exemplary embodiments, the method according to the fifth aspect of the present disclosure may further comprise: transmitting a configuration request for the group of communication devices to the VAL server. The configuration request may include information about an end point to which a notification related to the group of communication devices is to be sent.

In accordance with some exemplary embodiments, the end point may comprise the application specific server or any other suitable functional entity.

In accordance with some exemplary embodiments, the method according to the fifth aspect of the present disclosure may further comprise: receiving a response to the configuration request from the VAL server.

According to a sixth aspect of the present disclosure, there is provided an apparatus which may be implemented as an application specific server. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as an application specific server. The apparatus may comprise a receiving unit and optionally a transmitting unit. In accordance with some exemplary embodiments, the receiving unit may be operable to carry out at least the receiving step of the method according to the fifth aspect of the present disclosure. The transmitting unit may be operable to carry out at least the transmitting step of the method according to the fifth aspect of the present disclosure.

According to a ninth aspect of the present disclosure, there is provided a method performed by a group management server. The method comprises receiving dynamic information for a group of communication devices from a group management client. The method further comprises transmitting the dynamic information for the group of communication devices to a VAL server.

In accordance with some exemplary embodiments, the dynamic information for the group of communication devices may comprise at least one of:

a VAL group identifier of the group of communication devices;

a list of identifiers of one or more members newly joined the group of communication devices; and a list of identifiers of one or more members newly left the group of communication devices.

In accordance with some exemplary embodiments, the group management server may configure the group of communication devices, in response to receiving a configuration request for the group of communication devices from the VAL server. The configuration request may include a group identifier for a proximity-based service assigned to the group of communication devices.

In accordance with some exemplary embodiments, the configuration request may further include information about an end point to which a notification related to the group of communication devices is to be sent.

In accordance with some exemplary embodiments, the configuration of the group of communication devices by the group management server may comprise: performing dynamic configuration of the group of communication devices, according to the configuration request received from the VAL server; and transmitting a response to the configuration request to the VAL server.

In accordance with some exemplary embodiments, the group identifier for the proximity-based service assigned to the group of communication devices may be provided to the group management client by the group management server.

According to a tenth aspect of the present disclosure, there is provided an apparatus which may be implemented as a group management server. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a group management server. The apparatus may comprise a receiving unit and a transmitting unit. In accordance with some exemplary embodiments, the receiving unit may be operable to carry out at least the receiving step of the method according to the ninth aspect of the present disclosure. The transmitting unit may be operable to carry out at least the transmitting step of the method according to the ninth aspect of the present disclosure.

According to a thirteenth aspect of the present disclosure, there is provided a method performed by a group management client (e.g., on a terminal device). The method comprises determining a group identifier for a proximity-based service assigned to a group of communication devices. The method further comprises transmitting dynamic information for the group of communication devices to a group management server, according to the group identifier for the proximity-based service assigned to the group of communication devices.

In accordance with some exemplary embodiments, the dynamic information for the group of communication devices described in connection with the method according to the thirteenth aspect of the present disclosure may correspond to the dynamic information for the group of communication devices described in connection with the method according to the ninth aspect of the present disclosure.

In accordance with some exemplary embodiments, the group identifier for the proximity-based service assigned to the group of communication devices may be received from the group management server.

In accordance with some exemplary embodiments, the method according to the thirteenth aspect of the present disclosure may further comprise: sending group information to another group management client (e.g., on another terminal device). The group information may include the group identifier for the proximity-based service assigned to the group of communication devices.

According to a fourteenth aspect of the present disclosure, there is provided an apparatus which may be implemented as a terminal device. The apparatus may comprise one or more processors and one or more memories storing computer program codes. The one or more memories and the computer program codes may be configured to, with the one or more processors, cause a group management client on the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a terminal device. In an exemplary embodiment, a group management client may be implemented on the terminal device. The apparatus may comprise a determining unit and a transmitting unit. In accordance with some exemplary embodiments, the determining unit may be operable to carry out at least the determining step of the method according to the thirteenth aspect of the present disclosure. The transmitting unit may be operable to carry out at least the transmitting step of the method according to the thirteenth aspect of the present disclosure.

In accordance with some exemplary embodiments, the VAL server described with respect to any of the aforementioned aspects of the present disclosure may comprise a VAE server.

In accordance with some exemplary embodiments, the application specific server described with respect to any of the aforementioned aspects of the present disclosure may comprise a V2X application specific server.

In accordance with some exemplary embodiments, the group management server described with respect to any of the aforementioned aspects of the present disclosure may comprise a SEAL server.

In accordance with some exemplary embodiments, the group management client described with respect to any of the aforementioned aspects of the present disclosure may comprise a SEAL client.

According to a seventeenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the first, fifth or ninth aspect of the present disclosure.

According to an eighteenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the first, fifth or ninth aspect of the present disclosure.

According to a nineteenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the thirteenth aspect of the present disclosure.

According to a twentieth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the thirteenth aspect of the present disclosure.

According to a twenty-first aspect of the present disclosure, there is provided a method implemented in a communication system which may include a host computer, a base station and a UE. The method may comprise, at the host computer, receiving user data transmitted to the base station from the UE which may perform any step of the method according to the thirteenth aspect of the present disclosure.

According to a twenty-second aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the thirteenth aspect of the present disclosure.

According to a twenty-third aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the first, fifth or ninth aspect of the present disclosure.

According to a twenty-fourth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the first, fifth or ninth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 6C is a flowchart illustrating yet another method according to some embodiments of the present disclosure;

FIG. 6D is a flowchart illustrating a further method according to some embodiments of the present disclosure;

DETAILED DESCRIPTION

Figure 1:
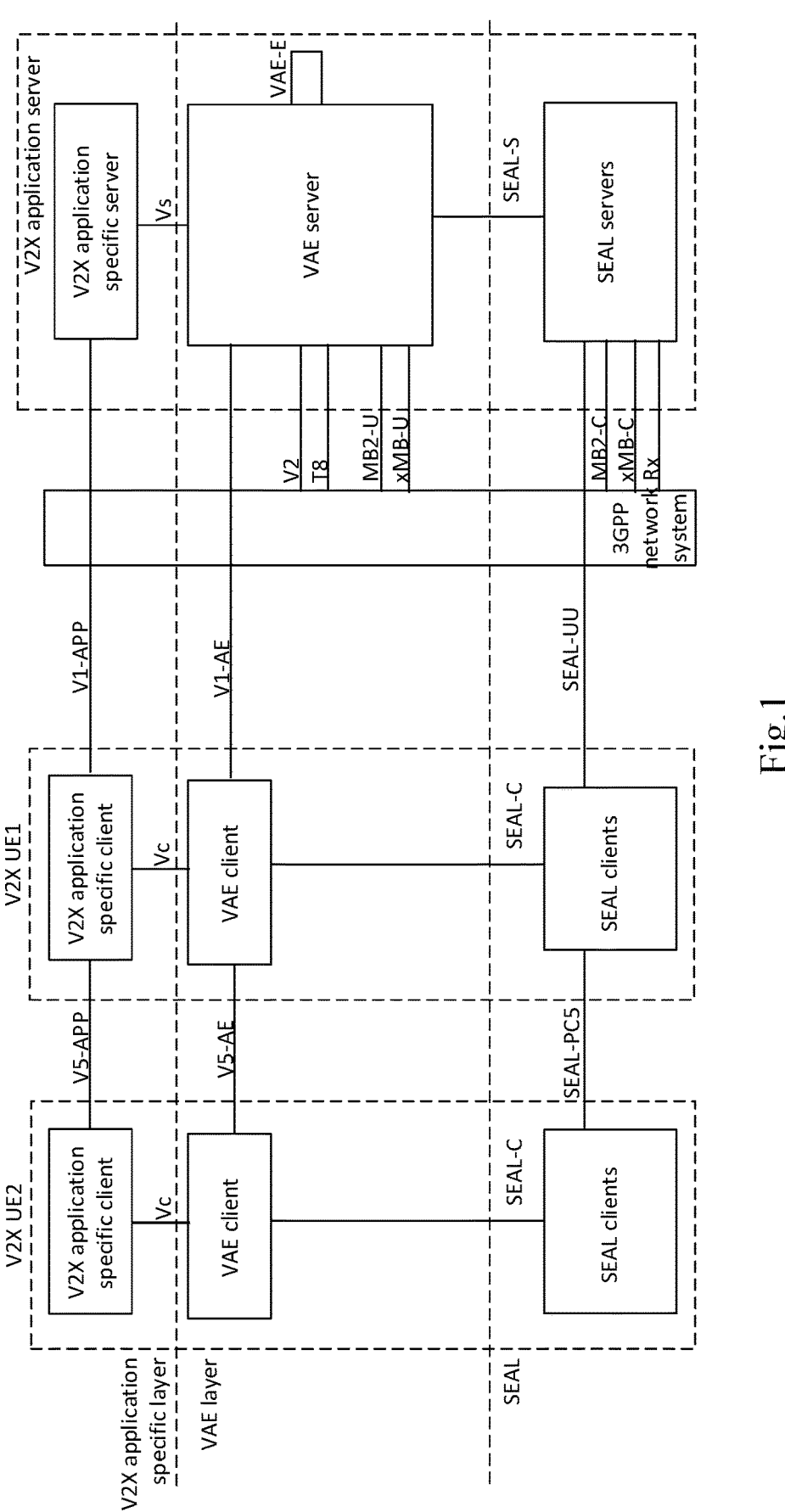
FIG. 1 is a diagram illustrating an exemplary V2X application layer model according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprise", "comprising", "has", "having", "include" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow V2X/ITS communication to be implemented in a wireless communication network. In a V2X application scenario such as platooning or cooperative driving, a dynamic group may be created for V2X UEs which may interact with each other through PC5 communication. The dynamic group, compared to a static group, may need to be updated during platooning operation, and group parameters may need to be exchanged between a V2X application server and V2X UEs. A V2X UE acting as a group leader (e.g. a platoon leader) may be responsible for communicating group parameters with other members in the group. Dynamic group management may be expected for the PC5 communication.

FIG. 1 is a diagram illustrating an exemplary V2X application layer model according to an embodiment of the present disclosure. This exemplary model may be configured for V2X communications over PC5 interface and Uu interface, as defined in 3GPP technical specification (TS) 23.286 V16.1.0, where the entire content of this technical specification is incorporated into the present disclosure by reference. FIG. 1 schematically shows some devices and elements such as V2X UE1, V2X UE2 and a V2X application server which may be involved in V2X communications. V2X UE1 may communicate with a V2X application server over V1 reference point. V2X UE1 and V2X UE2 may communicate over V5 reference point. V2X UE1 may act as a UE-to-network relay, so as to enable V2X UE2 to access the V2X application server over V1 reference point.

As shown in FIG. 1, there may be three layers in the V2X application layer model, including the V2X application specific layer, the VAE layer and the SEAL. The VAE layer can provide support information to the V2X application. The V2X application layer functional entities for the V2X UE1/UE2 and the V2X application server may be grouped into the V2X application specific layer and the VAE layer. The VAE layer can offer the VAE capabilities to the V2X application specific layer. The V2X application layer functional model may utilize the SEAL services as specified in 3GPP TS 23.434 V16.1.0, where the entire content of this technical specification is incorporated into the present disclosure by reference.

According to an exemplary embodiment, a VAE server may be located in the VAE layer. The SEAL services utilized by the VAE layer may comprise location management, group management, configuration management, identity management, key management and network resource management as specified in 3GPP TS 23.434 V16.1.0.

According to an exemplary embodiment, the V2X application specific layer may consist of the V2X application specific functionalities. The V2X application server may consist of the VAE server, SEAL servers and a V2X application specific server. The VAE server can provide the V2X application layer support functions to the V2X application specific server over Vs reference point.

According to an exemplary embodiment, the V2X UE1/UE2 may consist of a VAE client, SEAL clients and a V2X application specific client. The VAE client can provide the V2X application layer support functions to the V2X application specific client over Vc reference point. In some deployments, the client and server entities of the SEAL can be part of the VAE client and the VAE server respectively.

According to an exemplary embodiment, the VAE client may act as a VAL client for its interaction with the SEAL clients as specified in 3GPP TS 23.434 V16.1.0. The VAE server may act as a VAL server for its interaction with the SEAL servers as specified in 3GPP TS 23.434 V16.1.0.

According to an exemplary embodiment, in the VAE layer, the VAE client of V2X UE1 may communicate with the VAE server over V1-AE reference point, and the VAE client of V2X UE2 may communicate with the VAE client of V2X UE1 over V5-AE reference point. In the V2X application specific layer, the V2X application specific client of V2X UE1 may communicate with the V2X application specific server over V1-APP reference point, and the V2X application specific client of V2X UE2 may communicate with the VAE client of V2X UE1 over V5-APP reference point.

According to an exemplary embodiment, the VAE client may interact with SEAL clients over the SEAL-C reference point specified for each SEAL service. The VAE server may interact with SEAL servers over the SEAL-S reference point specified for each SEAL service. The interaction between the SEAL clients may be supported by SEAL-PC5 reference point specified for each SEAL service. The interaction between a SEAL client and the corresponding SEAL server may be supported by SEAL-UU reference point specified for each SEAL service. The SEAL-C, SEAL-S, SEAL-PC5 and SEAL-UU reference points may be configured for each SEAL service as specified in 3GPP TS 23.434 V16.1.0.

In order to support distributed VAE server deployments, the VAE server may interact with another VAE server over VAE-E reference point. According to an exemplary embodiment, V2X UE1 may act as a UE-to-network relay, so as to enable the VAE client on V2X UE2 to access the VAE server over V1-AE reference point, and to enable the V2X application specific client on V2X UE2 to access the V2X application specific server over V1-APP reference point.

According to an exemplary embodiment, a V1-AE message may be sent over unicast, transparent multicast via xMB, transparent multicast via MB2, etc. The non-transparent multicast via xMB may be triggered by a V1-AE message. Multicast distribution can be supported by both transparent and non-transparent multicast modes. As shown in FIG. 1, the VAE server may interact with a 3GPP network system over V2, MB2, xMB, Rx and T8 reference points.

Although various embodiments are explained in the context of V2X communications, some embodiments can also be used for other types of direct communications, including D2D and sidelink communications, etc. Accordingly, the term "V2X" herein can be replaced with the term "D2D" for some exemplary embodiments. Moreover, some embodiments may be used in various wireless systems, including systems that operate according to 4G/LTE or 5G/NR standards, or future radio technologies and standards.

It can be appreciated that some V2X scenarios may require group-based communication. Unlike V2X communication for safety scenarios where all V2X UEs in the communication range receive broadcasted communication, the group-based communication may be expected to be received only by the V2X UEs as the members of that group. In some scenarios (e.g. platooning, etc.), the V2X UEs may be required to be determined dynamically (e.g., with the assistance of a V2X application server or independently by the V2X UEs when they are not connected to the network) during the operation. In this case, a dynamic group may be established, and the group parameters of the dynamic group may need to be updated dynamically and communicated between the V2X application server and the V2X UEs. Moreover, each V2X application group may have to be mapped to a proximity-based service (ProSe) Layer-2 group ID in order to avoid any interference during PC5 communications for the V2X application group. The ProSe Layer-2 group ID may be only used in PC5 V2X group communications (without the involvement of the V2X application server).

According to an exemplary embodiment, dynamic group creation may be performed as defined in 3GPP TS 23.286 V16.1.0. According to 3GPP TS 23.286 V16.1.0, the information flow "Push Layer-2 group ID mapping" may be communicated from a VAE server to a VAE client and between VAE clients. The information flow "Push Layer-2 group ID mapping" as described in Table 9.12.2.1-1 of 3GPP TS 23.286 V16.1.0 includes information elements "Dynamic group information" and "ProSe Layer-2 group ID". The dynamic group information may include a dynamic group ID, a group definition and a group leader ID. The ProSe Layer-2 group ID may be corresponding to the dynamic group information.

In addition, 3GPP TS 23.286 V16.1.0 also defines in subclause 9.12.2.2 the information flow "Configure dynamic group" from a V2X application specific sever to a VAE server and from the V2X application specific server to a VAE client. The information flow "Configure dynamic group" as described in Table 9.12.2.2-1 of 3GPP TS 23.286 V16.1.0 includes an information element "Dynamic group information" which may include a dynamic group ID, a group definition and a group leader ID. However, it is noted that the existing procedure for dynamic group creation as defined in 3GPP TS 23.286 V16.1.0 doe not support the information flow "Configure dynamic group" from the V2X application specific server to the VAE client.

Figure 2A:
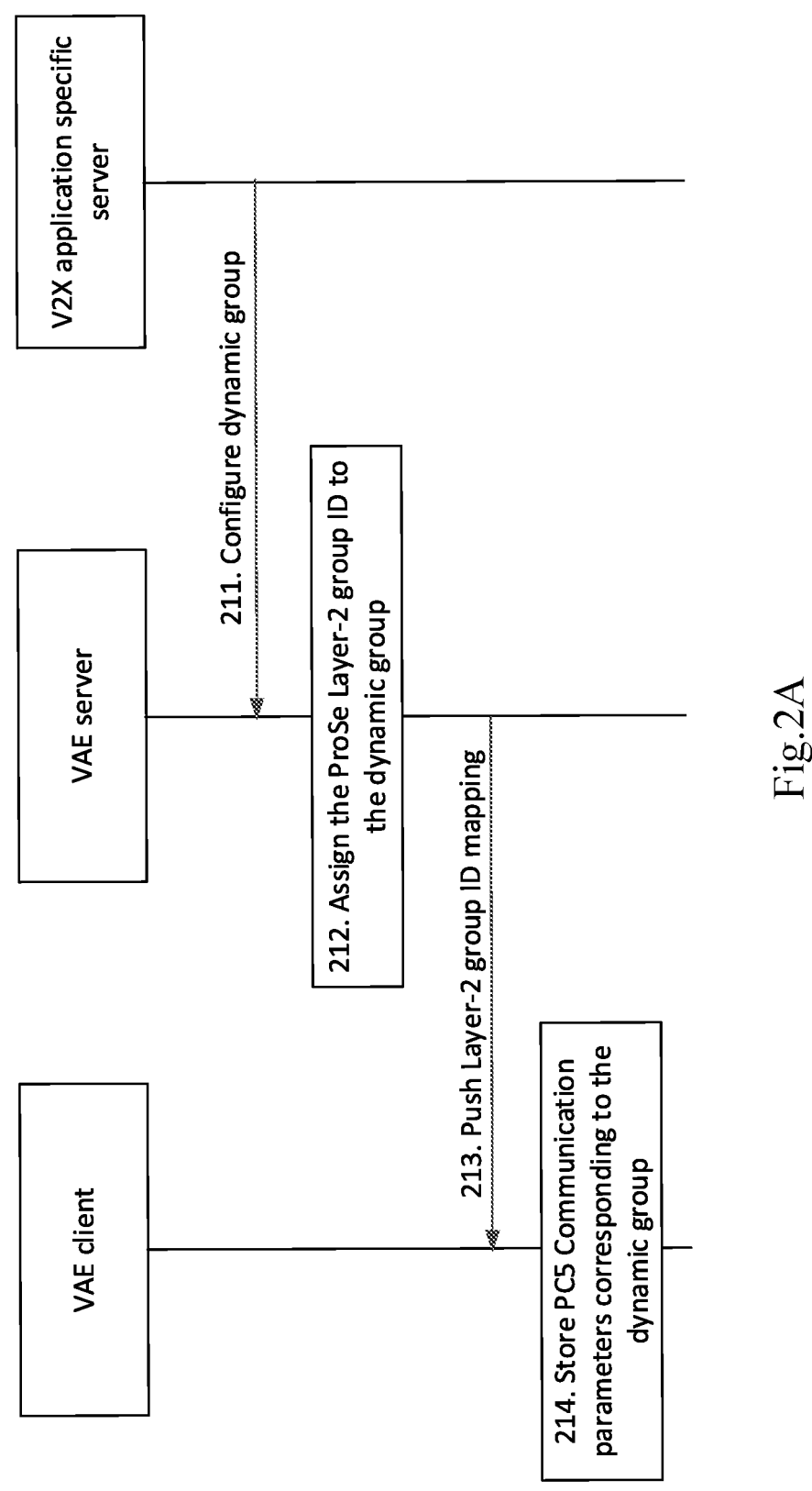
FIG. 2A is a diagram illustrating an exemplary procedure of on-network dynamic group creation according to an embodiment of the present disclosure.

FIG. 2A is a diagram illustrating an exemplary procedure of on-network dynamic group creation according to an embodiment of the present disclosure. The "on-network" operation may refer to the communication operation involving network (e.g., a radio network, a core network, etc.) support. In the procedure of on-network dynamic group creation, a V2X application specific server may be responsible for V2X dynamic group formation (e.g., group ID assignment, group definition, etc.) and membership management (e.g., user authorization, etc.). The VAE layer on a VAE server may support assigning a ProSe Layer-2 group ID for application layer V2X dynamic group formation to V2X UEs in the Uu communication range. According to an exemplary embodiment, a V2X application dynamic group may be defined at the V2X application specific server, and a V2X UE may be assigned as a dynamic group leader. The VAE server may have a pool of the ProSe Layer-2 group IDs that can be assigned to dynamic groups.

According to the procedure for on-network dynamic group creation as illustrated in FIG. 2A, the V2X application specific server may request 211 the VAE server to configure a dynamic group corresponding to the dynamic group information (e.g., a dynamic group ID, a group definition, a group leader, etc.). In order to enable PC5 communication, the VAE server may assign 212 a ProSe Layer-2 group ID from the available ProSe Layer-2 group ID pool to the dynamic group corresponding to the received dynamic group information. The VAE server may trigger 213 a push request including the ProSe Layer-2 group ID corresponding to the dynamic group information to a VAE client. Then the VAE client may store 214 the received PC5 communication parameters corresponding to the dynamic group information received from the VAE server.

Optionally, the VAE client may further announce the dynamic group information including the corresponding ProSe Layer-2 group ID to other VAE clients within the PC5 communication proximity on a PC5 channel dedicated for V5-AE communications, enabling more V2X UEs to join the dynamic group. In the case that there is a loss of connectivity with the network by the V2X UEs, the service continuity can be ensured by the V2X UEs switching to PC5 communication for which the VAE server assigned ProSe Layer-2 group ID corresponding to the dynamic group information may be used.

In the on-network dynamic group creation procedure of FIG. 2A, the VAE capabilities (e.g., the VAE client and the VAE server) may utilize the group management services (e.g., creation, join and leave) of SEAL based on the group configuration information (e.g., a group join policy, a group leader, etc.) provided by the V2X application specific layer. However, a standalone VAE layer interaction (i.e., between the VAE client and the VAE server) is employed in the procedure of group formation, without the interaction between SEAL services and the VAE layer. In addition, in this on-network model, the VAE client receiving the pushed Layer-2 group ID mapping may be responsible for announcing the group information to other VAE clients in proximity via V5-AE interface. In the case that some UEs are not reachable by PC5 communication, there may be no notification to the V2X application specific server about the group member joining/leaving.

Figure 2B:
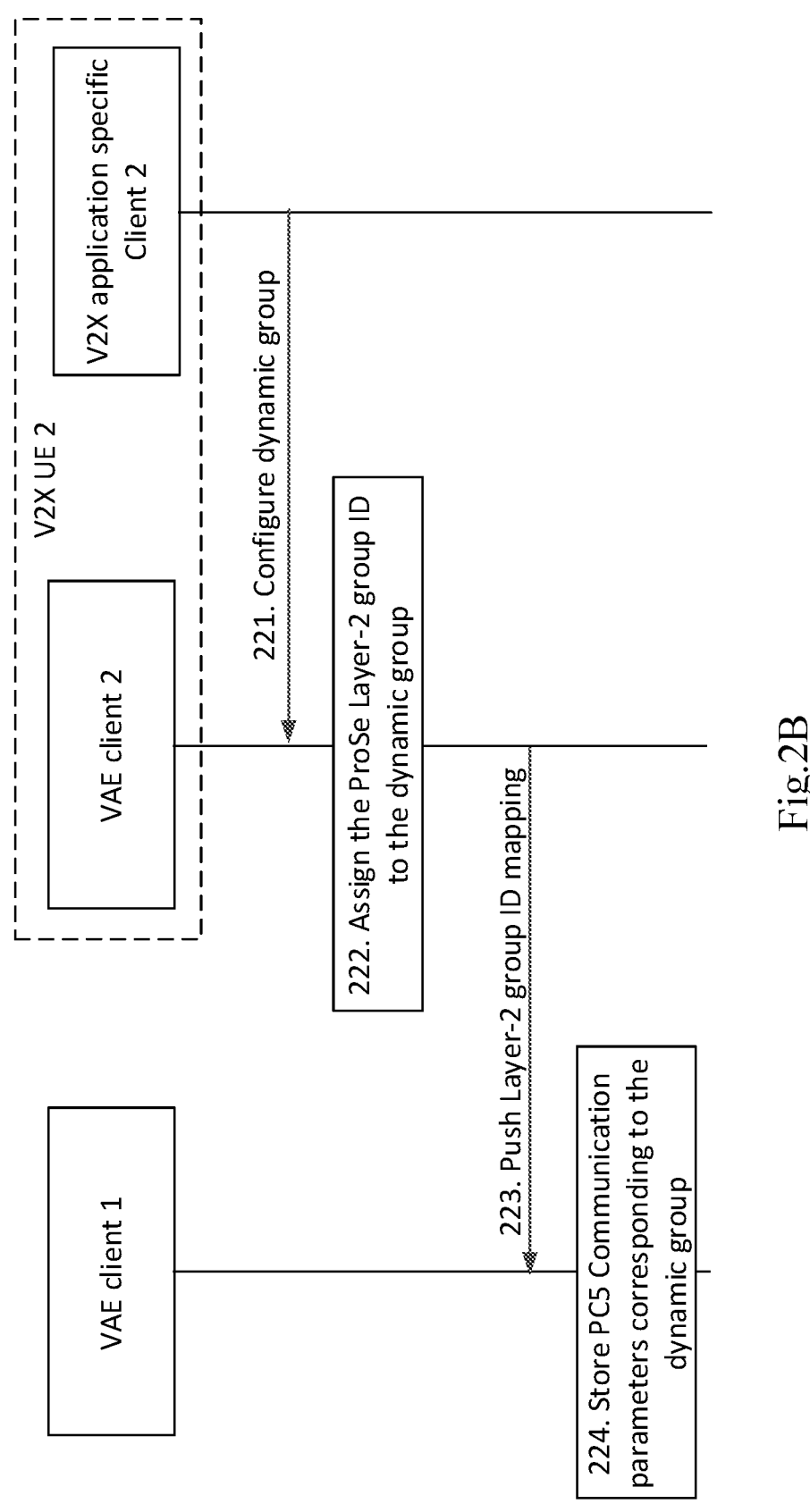
FIG. 2B is a diagram illustrating an exemplary procedure of off-network dynamic group creation according to an embodiment of the present disclosure.

FIG. 2B is a diagram illustrating an exemplary procedure of off-network dynamic group creation according to an embodiment of the present disclosure. The "off-network" operation may refer to the UE to UE communication operation without the network support. In the procedure of off-network dynamic group creation, a V2X application specific client (e.g., V2X application specific client 2 configured for V2X UE2 in FIG. 2B) may be responsible for V2X dynamic group formation (e.g., group ID assignment, group definition, etc.). The VAE layer on a client (e.g., VAE client 2 configured for V2X UE2 in FIG. 2B) may support assigning a ProSe Layer-2 group ID for application layer V2X dynamic group formation. According to an exemplary embodiment, VAE clients may be provisioned with ProSe Layer-2 group ID generation rules corresponding to the group information. In another exemplary embodiment, VAE clients, in the case that they are in the coverage area of a VAE server, may be configured with the unique pool of ProSe Layer-2 group IDs.

According to the procedure for off-network dynamic group creation as illustrated in FIG. 2B, the V2X application specific client 2 may request 221 the VAE client 2 to configure a dynamic group corresponding to the dynamic group information (e.g. a dynamic group ID, a group definition, a group leader, etc.). The VAE client 2 may assign 222 a ProSe Layer-2 group ID from the pool of configured ProSe Layer-2 group IDs. According to an exemplary embodiment, each VAE client may generate a ProSe Layer-2 group ID independently based on the provisioned ProSe Layer-2 group ID generation rules for its group information. The VAE client 2 may further announce 223 the dynamic group information including the corresponding ProSe Layer-2 group ID to other VAE clients (e.g., VAE client 1 as shown in FIG. 2B) within the PC5 communication proximity on a PC5 channel dedicated for V5-AE communications, enabling more V2X UEs to join the dynamic group. Then VAE client 1 may store 224 the PC5 communication parameters corresponding to the dynamic group information received from VAE client 2.

According to the procedures for dynamic group creation as illustrated in FIG. 2A and FIG. 2B, there is no response to the configure dynamic group request of the V2X application specific server. There is also no indication of an end point to which the response may be provided. Therefore, the V2X application specific server may not be aware of the situation of a group member joining the dynamic group and/or leaving the dynamic group (e.g., there may be some V2X UEs not reachable by PC5 communication). In addition, the V2X application may expect to use some SEAL group management services, but there is no SEAL interaction specified in any existing procedure for V2X dynamic group management.

Figure 2C:
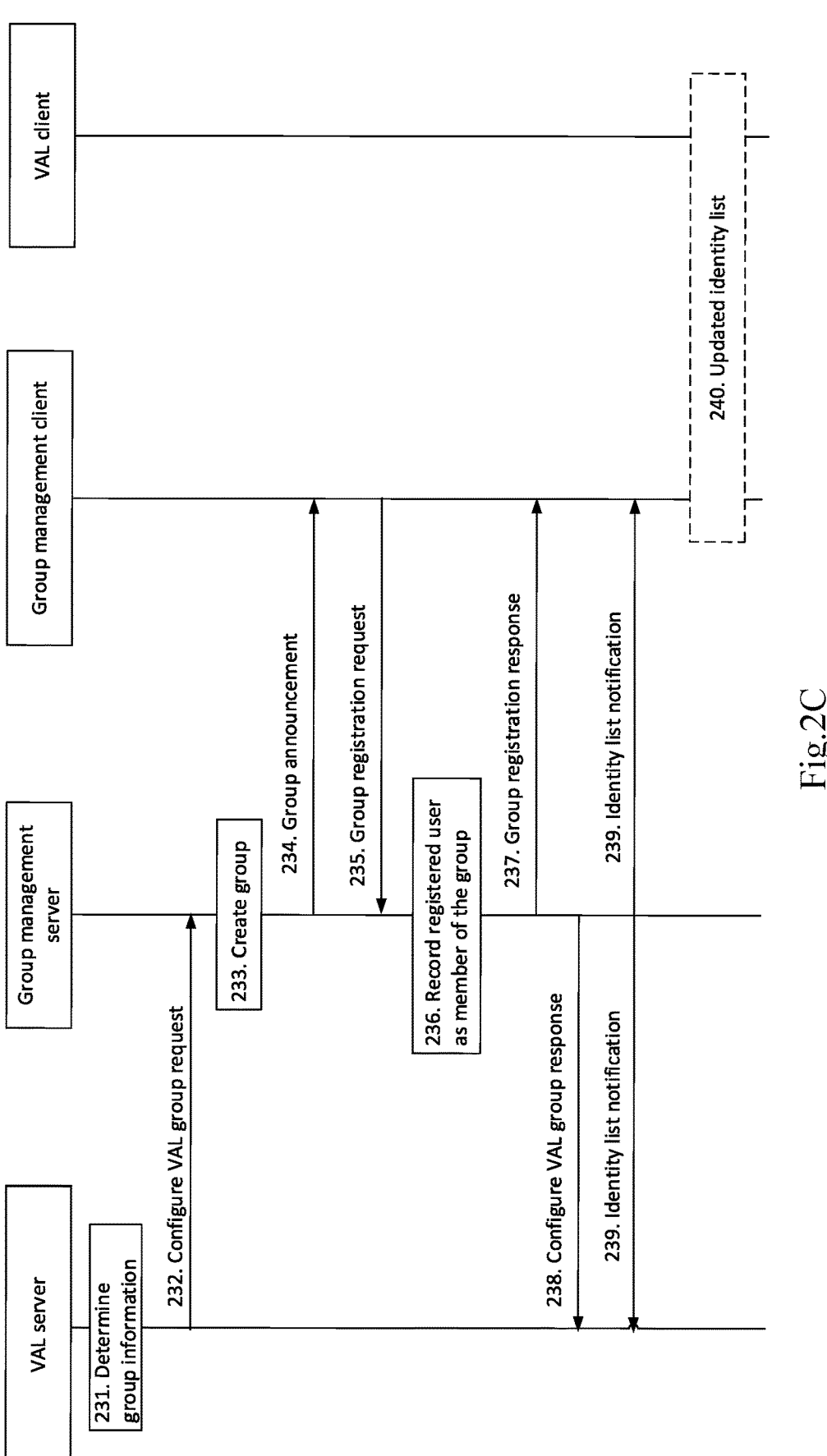
FIG. 2C is a diagram illustrating an exemplary procedure of group announcement and join according to an embodiment of the present disclosure.

FIG. 2C is a diagram illustrating an exemplary procedure of group announcement and join according to an embodiment of the present disclosure. The exemplary procedure may be performed for establishing group communication from a group management server to a group management client. The group management client, the group management server, a VAL server and a VAL client shown in FIG. 2C may belong to the same VAL system. The VAL server may be aware of the users' identities and authorized to form a VAL group.

According to the procedure for group announcement and join as illustrated in FIG. 2C, the VAL server may determine 231 group information and an identity list of UEs to which the group announcement is to be sent. The determination may be based on the list of authorized UEs and other criteria (e.g. user consent, service, or vehicle driving profile). The VAL server may configure the VAL group for Uu communication defined by a VAL group ID for one or more VAL services with a list of VAL service IDs, e.g., by sending 232 a configure VAL group request to the group management server. The group management server may create 233 an empty group based on the information provided in the configure VAL group request. The group management server may announce 234 the VAL group to the group management client. The group management client may register to the VAL group communication using the VAL group ID, e.g., by sending 235 a VAL group registration request to the group management server. Then the group management server may record 236 a user who has registered to be the member of the group. The group management server may send 237 a VAL group registration response to the group management client. In addition, the group management server may send 238 a configure VAL group response to the VAL server. Optionally, the group management server may perform step 238 at any time after step 234. As shown in FIG. 2C, the group management server may send 239 an identity list notification to the VAL server and/or the group management client about the newly registered users. The group management client may inform 240 the VAL client about the updated identity list.

Figure 2D:
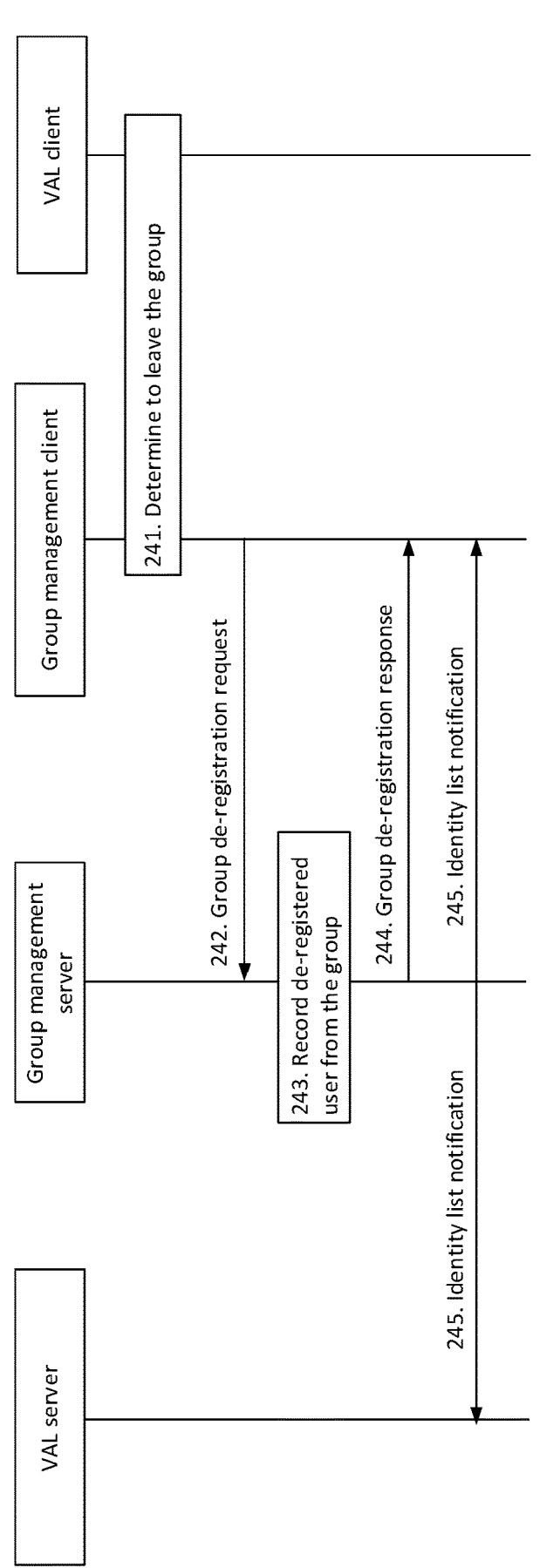
FIG. 2D is a diagram illustrating an exemplary procedure of group member leave according to an embodiment of the present disclosure.

FIG. 2D is a diagram illustrating an exemplary procedure of group member leave according to an embodiment of the present disclosure. The exemplary procedure may be performed for enabling a group member to leave the group by de-registering. The group may be previously defined on a group management server including a list of registered users and each member of the group. A VAL server may be aware of the group by communicating with the group management server.

According to the procedure of group member leave as illustrated in FIG. 2D, a VAL client may determine 241 to de-register member from the group and the group management client may be aware of it. The group management client may initiate 242 a group de-registration request towards the group management server. The group management server may check the authorization of the group de-registration request and update the group member list, e.g., by recording 243 the user de-registered from the group. Then the group management server may send 244 a group de-registration response to the group management client. As shown in FIG. 2D, the group management server may send 245 an identity list notification about the leaving registered user to other members of the group and the VAL server.

According to the procedures shown in FIG. 2C and FIG. 2D, SEAL services can provide the generic support for all vertical applications in relation to group management (e.g., announcement, join and leave). The group announcement may be sent to each client in the group. Comparing to V2X application group management, the SEAL group management may use a different model to ensure that all invitees can receive the group management information.

Various exemplary embodiments of the present disclosure propose a solution of dynamic group management. In accordance with some exemplary embodiments, application programming interfaces (APIs) and procedures may be provided for notification about dynamic group information (e.g., including a group ID, a list of IDs of one or more members newly joined or left the group, etc.), from a V2X UE (e.g., a platoon leader) to a VAE server, and from the VAE server to a V2X application specific server. Application of various embodiments can improve dynamic group creation and management, so as to enable an end point such as a V2X application specific server to obtain dynamic group information. In addition, some exemplary embodiments may support the group management functionalities between a group management server (e.g., a SEAL server) and a group management client (e.g., a SEAL client), so that various SEAL services may be used by the V2X application efficiently.

In accordance with some exemplary embodiments, the group management function between a client and a server may be moved from the VAE layer to the SEAL layer. A group management client may be configured to send group information to other group management clients via PC5 communication. According to an exemplary embodiment, a group management client may send an identity list notification to a group management server, so as to confirm one or more members joining or leaving a dynamic group. In response to receipt of the identity list notification from the group management client, the group management server may notify a VAE server that there is a change of the dynamic group. Then, a configure dynamic group notification indicating this change may be sent from the VAE server to a V2X application specific server. Alternatively or additionally, the configure dynamic group notification may be sent to an end point pre-designated to receive such notification.

Figure 3:
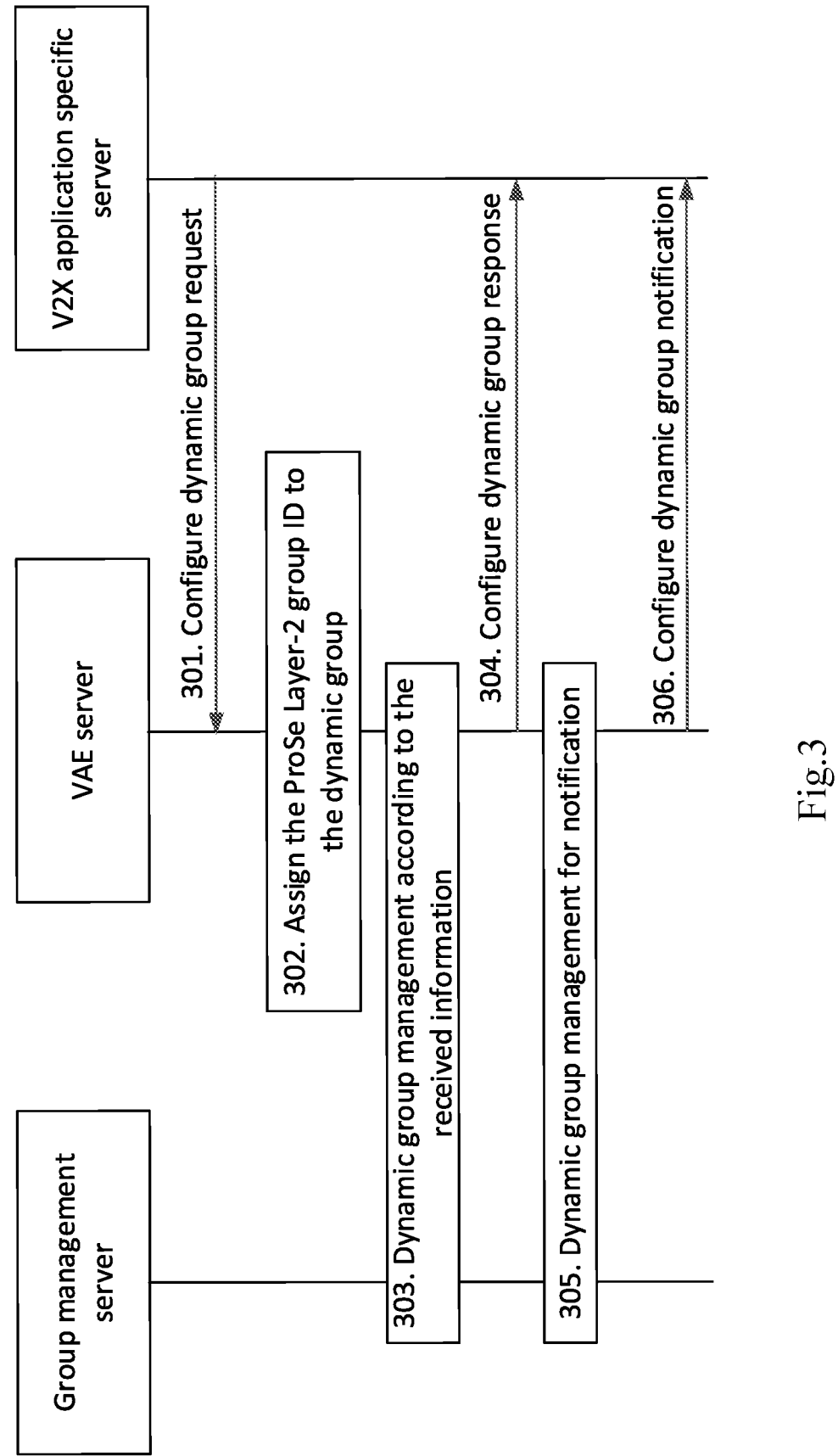
FIG. 3 is a diagram illustrating another exemplary procedure of on-network dynamic group creation according to an embodiment of the present disclosure.

FIG. 3 is a diagram illustrating another exemplary procedure of on-network dynamic group creation according to an embodiment of the present disclosure. For simplicity, FIG. 3 only depicts some exemplary network elements such as a V2X application specific server, a VAE server and a group management server. It can be recognized that signaling messages and network elements shown in FIG. 3 are just as examples, and more or less alternative signaling messages and network elements may be involved in the dynamic group creation procedure according to some embodiments of the present disclosure.

Similar to the procedure described with respect to FIG. 2A, a V2X application dynamic group may be defined at the V2X application specific server, and a V2X UE may be assigned as a dynamic group leader. The VAE server may have a pool of the ProSe Layer-2 group IDs that can be assigned to dynamic groups. Different from the procedure shown in FIG. 2A, the group management server is involved in the dynamic group creation procedure shown in FIG. 3, and thus some SEAL interaction may be performed between the VAE server and the group management server.

According to the procedure for on-network dynamic group creation as illustrated in FIG. 3, the V2X application specific server may request 301 the VAE server to configure a dynamic group corresponding to the dynamic group information (e.g., a dynamic group ID, a group definition, a group leader, etc.), for example, by sending a configure dynamic group request. In accordance with an exemplary embodiment, the information flow for the configure dynamic group request from the V2X application specific sever to the VAE server may carry at least one of the following information elements:

Dynamic group information, which may include a dynamic group ID, a group definition, a group leader ID, and/or other kinds of information for the dynamic group; and End point information, indicating an end point to which a configure dynamic group notification may be sent.

In order to enable PC5 communication, the VAE server may assign 302 a ProSe Layer-2 group ID from the available ProSe Layer-2 group ID pool to the dynamic group corresponding to the received dynamic group information. The ProSe Layer-2 group ID assigned to the dynamic group may be provided to a group member for PC5 communication.

As shown in FIG. 3, the VAE server may perform dynamic group management 303 by interacting with the group management server according to the dynamic group information received in step 301. In response to receipt of a response (e.g., a configure VAL group response) from the group management server, the VAE server may respond 304 to the V2X application specific server for the dynamic group configuration, for example, by sending a configure dynamic group response. In accordance with an exemplary embodiment, the information flow for the configure dynamic group response from the VAE server to the V2X application specific sever may carry an information element to indicate a configuration result from the VAE server in response to the configure dynamic group request.

According to the procedure shown in FIG. 3, in response to receipt 305 of a dynamic group management notification (e.g., an identity list notification, etc.) from the group management server, the VAE server may notify 306 the V2X application specific server about the newly joined or left member(s) of the dynamic group, for example, by sending a configure dynamic group notification. In accordance with an exemplary embodiment, the information flow for the configure dynamic group notification from the VAE server to the V2X application specific sever may carry an information element to indicate dynamic group information for the dynamic group. The dynamic group information may include a dynamic group ID, a list of UE IDs corresponding to one or more newly joined or left group members, and/or other kinds of group information. In this way, the V2X application specific sever may be aware of a change of the dynamic group.

In accordance with an exemplary embodiment, an API such as "VAE_DynamicGroup API" may be used for a request/response operation for the dynamic group between the VAE server and the V2X application specific server. According to an exemplary embodiment, an API operation such as "Notify_DynamicGroup operation" may be performed to notify an end point (e.g., the V2X application specific server or other suitable functional entity) of the dynamic group information (e.g., information about group member joining or leaving) by the VAE server.

Figure 4:
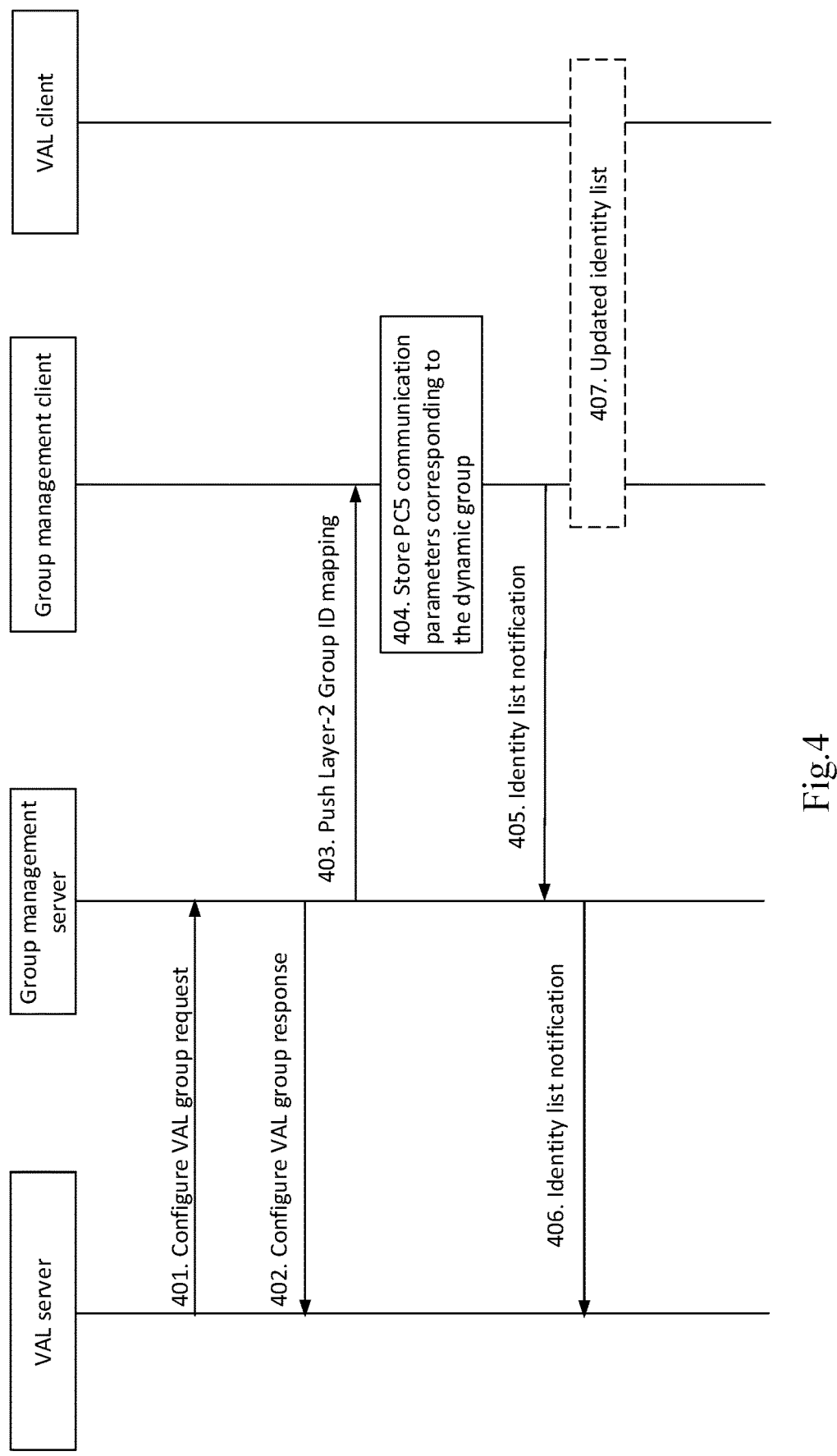
FIG. 4 is a diagram illustrating an exemplary procedure of dynamic group management according to an embodiment of the present disclosure.

FIG. 4 is a diagram illustrating an exemplary procedure of dynamic group management according to an embodiment of the present disclosure. This exemplary procedure may be performed for establishing group communication from a group management server to group management clients. For simplicity, FIG. 4 only depicts some exemplary network elements, including a VAL server, a group management server, a group management client and a VAL client. The group management server, the group management client, the VAL server and the VAL client may belong to the same VAL system. The VAL server may be aware of various users' identities (e.g., UE IDs) and authorized to form a VAL group. In accordance with some exemplary embodiments, a VAE server may act as the VAL server shown in FIG. 4, and a VAE client may act as the VAL client shown in FIG. 4.

According to the procedure for dynamic group management as illustrated in FIG. 4, the VAL server may configure 401 a VAL group defined by a VAL group ID to the group management server, for example, by sending a configure VAL group request. In accordance with an exemplary embodiment, the information flow for the configure VAL group request from the VAL server to the group management server may carry at least one of the following information elements:

VAL group ID, which may indicate a group ID used for the VAL group;

VAL group description, which may include information related to the VAL group (e.g., the group definition including policy, group size, group leader, etc.);

VAL service ID list, which may list VAL services whose service communications are to be enabled on the group;

Geo ID list, which may list geographical areas to be addressed by the group;

Identity list, which may comprise a list VAL IDs for UEs who are invited to be members of the group;

Identity list subscription, which may indicate an interest to receive a notification of newly registered VAL UE IDs and optionally include information about an end point to which the notification may be sent; and ProSe Layer-2 group ID, which may correspond to the dynamic group information known by the VAL server.

In accordance with an exemplary embodiment, the configure VAL group request may include a list of VAL IDs for UEs who are invited to be members of the group, the group leader and a ProSe Layer-2 group ID. The ProSe Layer-2 group ID may be used for PC5 communication between members of the VAL group. Based at least in part on the information provided in the configure VAL group request, the group management server can configure a dynamic group and send 402 a configure VAL group response to the VAL server.

As shown in FIG. 4, the group management server may trigger 403 a push request (e.g., push Layer-2 group ID mapping) including a ProSe Layer-2 group ID corresponding to the dynamic group information to the group management client. In accordance with an exemplary embodiment, the information flow for the push Layer-2 group ID mapping from the group management server to the group management client may carry at least one of the following information elements:

Dynamic group information, which may include a dynamic group ID, a group definition, a group leader ID, and/or other possible group information (e.g., PC5 communication parameters, etc.); and ProSe Layer-2 group ID, which may correspond to the dynamic group information.

According to the procedure for dynamic group management as illustrated in FIG. 4, the group management client may store 404 the received PC5 communication parameters corresponding to the dynamic group information from the group management server. In accordance with some exemplary embodiments, the group management client may further announce the dynamic group information including the corresponding ProSe Layer-2 group ID to other group management clients within the PC5 communication proximity on a PC5 channel dedicated for group management-PC5 communications, enabling more UEs to join the dynamic group.

In accordance with an exemplary embodiment, the group management client may send 405 an identity list notification about the newly joined or left group members to the group management server. Then, the group management server may send 406 an identity list notification about the newly joined or left members to the VAL server. According to the procedure as illustrated in FIG. 4, the group management client may inform 407 the VAL client of the updated identity list.

In accordance with an exemplary embodiment, an identity list notification about the group members also may be sent from the group management server to the group management client. The information flow for the identity list notification from the group management server to the group management client or from the group management client to the group management server may carry at least one of the following information elements:

VAL group ID, which may include an identity of the VAL group; and

Identity list, which may comprise a list of VAL IDs for UEs who are newly registered or de-registered members of the group.

In accordance with an exemplary embodiment, the information flow for the identity list notification from the group management server to the VAL server may carry at least one of information elements such as the VAL group ID and the identity list as described above.

In accordance with an exemplary embodiment, the VAL client such as a VAE client may be configured to communicate group information with another VAL client, for example, by sending a request of push Layer-2 group ID mapping. The information flow for the push Layer-2 group ID mapping between the VAE clients may carry at least one of the following information elements:

Dynamic group information, which may include a dynamic group ID, a group definition, a group leader ID, and/or other possible group information (e.g., PC5 communication parameters, etc.); and ProSe Layer-2 group ID, which may correspond to the dynamic group information.

Figure 5:
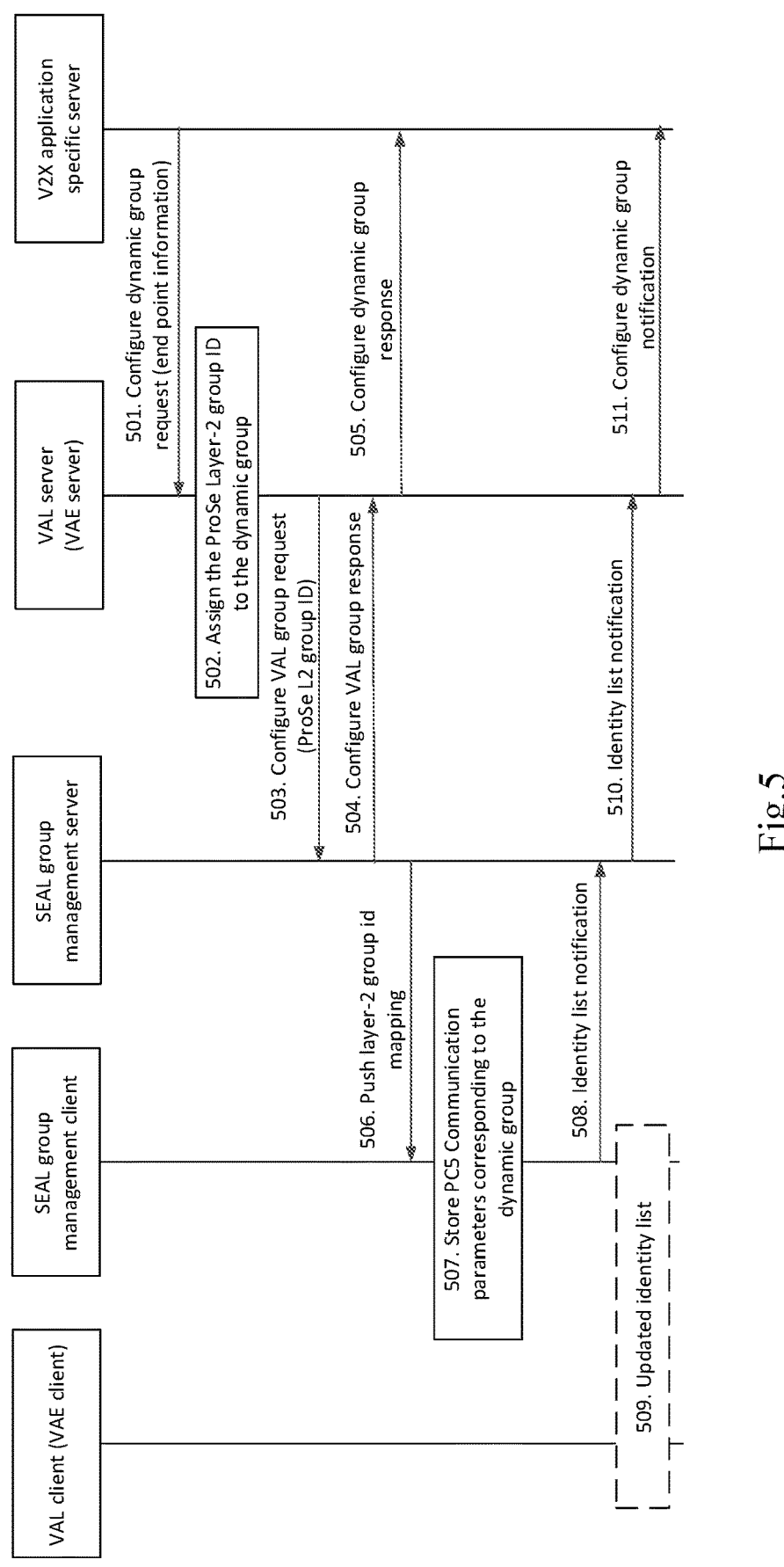
FIG. 5 is a diagram illustrating another exemplary procedure of dynamic group management according to an embodiment of the present disclosure.

FIG. 5 is a diagram illustrating another exemplary procedure of dynamic group management according to an embodiment of the present disclosure. In this embodiment, some procedures and information flows for dynamic group management (e.g., push Layer-2 group ID mapping, etc.) may be moved to SEAL, and one or more VAE server APIs (e.g., VAE_DynamicGroup API, etc.) may be moved to SEAL. Thus, the exemplary procedure shown in FIG. 5 may be performed to improve the on-network dynamic group creation with SEAL interaction and enhance the SEAL group management accordingly.

According to the procedure of dynamic group management as illustrated in FIG. 5, a V2X application specific server may send 501 a configure dynamic group request to a VAL server (e.g., a VAE server or other suitable functional entity) to configure a dynamic group corresponding to the dynamic group information (e.g., a dynamic group ID, a group definition, a group leader, etc.). In accordance with an exemplary embodiment, the configure dynamic group request may include end point information to indicate an end point to which a configure dynamic group notification may be sent.

In order to enable PC5 communication, the VAL server may assign 502 a ProSe Layer-2 group ID from the available ProSe Layer-2 group ID pool to the dynamic group corresponding to the dynamic group information received from the V2X application specific server. Then the VAL server may send 503 a configure VAL group request to a SEAL group management server. The configure VAL group request may include the ProSe Layer-2 group ID assigned to the dynamic group as part of VAL group configuration information. According to an exemplary embodiment, the ProSe Layer-2 group ID may be mapped to a VAL group ID used for a VAL group to be configured. Based at least in part on the configuration information provided in the configure VAL group request, the SEAL group management server may configure the VAL group and send 504 a configure VAL group response to the VAL server. In response to receipt of this response, the VAL server may send 505 a configure dynamic group response to the V2X application specific server, so as to indicate a configuration result of the dynamic group.

According to the procedure shown in FIG. 5, the SEAL group management server may send 506 a push Layer-2 group ID mapping message (e.g., including the ProSe Layer-2 group ID and some PC5 communication parameters corresponding to the dynamic group) towards a SEAL group management client. The SEAL group management client may store 507 the received PC5 communication parameters. In the case that an identity list of the VAL group is updated, e.g., due to one or more members joining or leaving the group, the SEAL group management client may inform 509 the VAL client of the updated identity list.

In accordance with an exemplary embodiment, the SEAL group management client may send 508 an identity list notification to the SEAL group management server about the newly registered or de-registered group members. Correspondingly, the SEAL group management server may send 510 an identity list notification to the VAL server about the newly registered or de-registered group members. In response to receipt of the identity list notification from the SEAL group management server, the VAL server may send 511 a configure dynamic group notification to the V2X application specific server about the newly registered or de-registered group members. Thus, the V2X application specific sever may be aware of the newly joined or left members of the dynamic group.

It is noted that some embodiments of the present disclosure are mainly described in relation to certain 3GPP specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 6A:
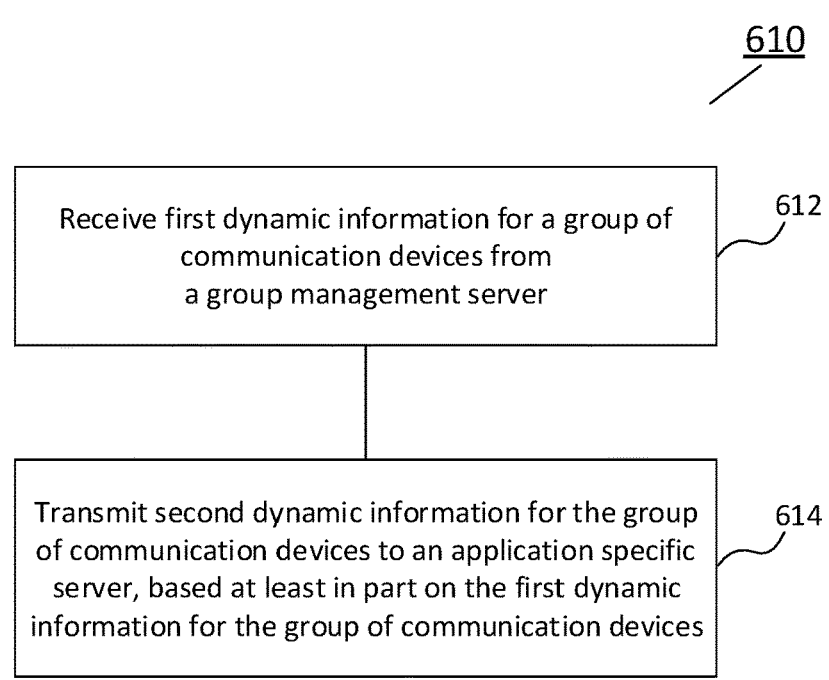
FIG. 6A is a flowchart illustrating a method according to some embodiments of the present disclosure.

FIG. 6A is a flowchart illustrating a method 610 according to some embodiments of the present disclosure. The method 610 illustrated in FIG. 6A may be performed by a VAL server or an apparatus communicatively coupled to the VAL server. In accordance with an exemplary embodiment, the VAL server may comprise a VAE server or any other functional entity that may be configured to support VAL/VAE capabilities. The VAL server (e.g., the VAE server shown in FIG. 3, the VAL server shown in FIG. 4 and the VAL/VAE server shown in FIG. 5) may provide the V2X application layer support functions to a V2X application specific server (e.g., the V2X application specific servers shown in FIG. 3 and FIG. 5). In some exemplary embodiments, the VAL server may be configured to utilize SEAL services by interaction with a group management server (e.g., the group management servers shown in FIGS. 3-4, and the SEAL group management server shown in FIG. 5).

According to the exemplary method 610 illustrated in FIG. 6A, the VAL server may receive first dynamic information for a group of communication devices (e.g., UEs, V2X devices, etc.) from a group management server (e.g., the group management servers shown in FIGS. 3-4, and the SEAL group management server shown in FIG. 5), as shown in block 612. Based at least in part on the first dynamic information for the group of communication devices, the VAL server may transmit second dynamic information for the group of communication devices to an application specific server (e.g., the V2X application specific servers shown in FIG. 3 and FIG. 5), as shown in block 614.

In accordance with an exemplary embodiment, the first dynamic information (e.g., information included in the identity list notification from the group management server to the VAL/VAE server, as described with respect to FIGS. 3-5) for the group of communication devices may comprise at least one of:
  a VAL group identifier of the group of communication devices;
  a list of identifiers of one or more members newly joined the group of communication devices; and
  a list of identifiers of one or more members newly left the group of communication devices.

In accordance with an exemplary embodiment, the second dynamic information (e.g., information included in the configure dynamic group notification from the VAL/VAE server to the VAX application specific server as described with respect to FIG. 3 and FIG. 5) for the group of communication devices may comprise at least one of:
  a dynamic group identifier of the group of communication devices;
  a list of identifiers of one or more members newly joined the group of communication devices; and
  a list of identifiers of one or more members newly left the group of communication devices.

In accordance with an exemplary embodiment, the VAL group identifier of the group of communication devices may be mapped to the dynamic group identifier of the group of communication devices, according to a specific mapping criterion.

In accordance with an exemplary embodiment, the group of communication devices may be configured by the VAL server or any other functional entity which may be configured to perform dynamic group formation. According to an exemplary embodiment, the VAL server may configure the group of communication devices, in response to receiving a first request (e.g., the configure dynamic group request as shown in FIG. 3 and FIG. 5) for configuring the group of communication devices from the application specific server. The first request may include information about a first end point to which a notification related to the group of communication devices is to be sent. The first end point may comprise the application specific server or other suitable functional entity which is designated to receive a configure dynamic group notification.

In accordance with an exemplary embodiment, the configuration of the group of communication devices by the VAL server may comprise: transmitting a second request (e.g., the configure VAL group request as shown in FIGS. 4-5) for configuring the group of communication devices to the group management server, according to the first request received from the application specific server. Optionally, the configuration of the group of communication devices by the VAL server may further comprise: receiving a response (e.g., the configure VAL group response as shown in FIGS. 4-5) to the second request from the group management server.

In accordance with an exemplary embodiment, the second request may include a group identifier for a proximity-based service (e.g., a ProSe Layer-2 group ID, etc.) assigned to the group of communication devices. Optionally, the second request may include information about a second end point to which a notification related to the group of communication devices is to be sent.

In accordance with an exemplary embodiment, the configuration of the group of communication devices by the VAL server may further comprise: transmitting a response (e.g., the configure dynamic group response as shown in FIG. 3 and FIG. 5) to the first request to the application specific server, according to the response to the second request received from the group management server.

Figure 6B:
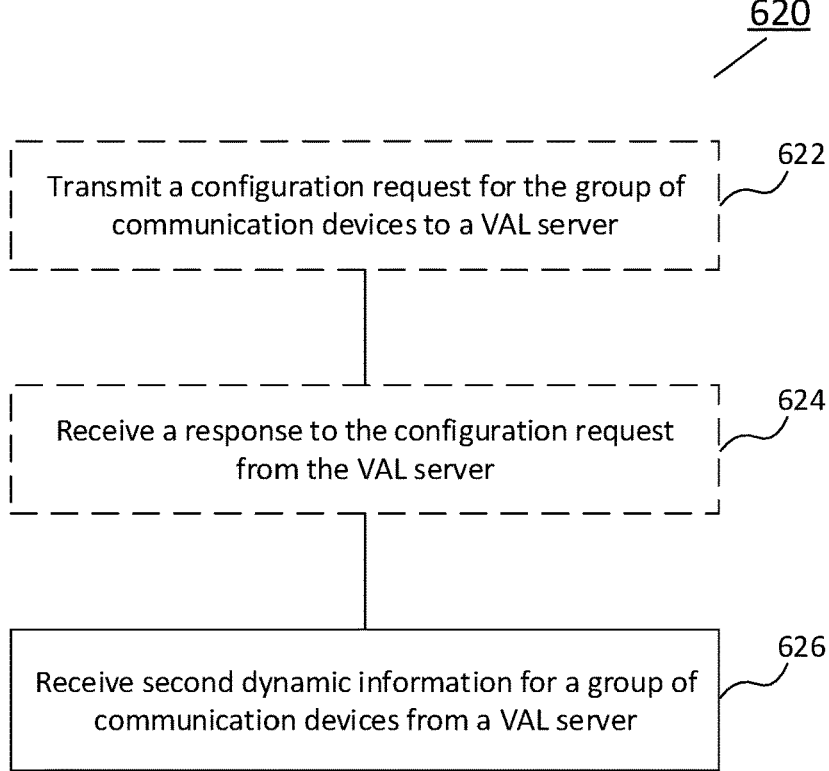
FIG. 6B is a flowchart illustrating another method according to some embodiments of the present disclosure.

FIG. 6B is a flowchart illustrating a method 620 according to some embodiments of the present disclosure. The method 620 illustrated in FIG. 6B may be performed by an application specific server or an apparatus communicatively coupled to the application specific server. In accordance with an exemplary embodiment, the application specific server may comprise a V2X application specific server or any other functional entity which may be configured to support V2X application specific layer capabilities. The application specific server (e.g., the V2X application specific server shown in FIG. 3 and FIG. 5) may be responsible for dynamic group formation and membership management, for example, by interaction with a VAL server (e.g., the VAE server shown in FIG. 3, the VAL server shown in FIG. 4 and the VALVAE server shown in FIG. 5).

According to the exemplary method 620 illustrated in FIG. 6B, the application specific server may receive second dynamic information (e.g., information included in a configure dynamic group notification) for a group of communication devices from a VAL server (e.g., the VAL server as described with respect to FIG. 6A), as shown in block 626. The second dynamic information may be based at least in part on first dynamic information (e.g., information included in an identity list notification) for the group of communication devices transmitted from a group management server (e.g., a SEAL server, etc.) to the VAL server.

It can be appreciated that the first dynamic information as described with respect to FIG. 6B may correspond to the first dynamic information as described with respect to FIG. 6A, and thus may include the same information element(s).

Similarly, the second dynamic information as described with respect to FIG. 6B may correspond to the second dynamic information as described with respect to FIG. 6A, and thus may include the same information element(s).

In accordance with an exemplary embodiment, the application specific server may configure the group of communication devices to the VAL server. In this case, the application specific server may transmit a configuration request (e.g., the configure dynamic group request as shown in FIG. 3 and FIG. 5) for the group of communication devices to the VAL server, as shown in block 622. The configuration request may include information about an end point (e.g., the application specific server or other suitable functional entity) to which a notification related to the group of communication devices is to be sent. Optionally, the application specific server may receive a response (e.g., the configure dynamic group response as shown in FIG. 3 and FIG. 5) to the configuration request from the VAL server, as shown in block 624.

FIG. 6C is a flowchart illustrating a method 630 according to some embodiments of the present disclosure. The method 630 illustrated in FIG. 6C may be performed by a group management server or an apparatus communicatively coupled to the group management server. In accordance with an exemplary embodiment, the group management server may comprise a SEAL server or any other functional server entity which may be configured to support SEAL group management capabilities. The group management server (e.g., the group management servers shown in FIGS. 3-4, and the SEAL group management server shown in FIG. 5) may provide SEAL services to the VAE layer by interaction with a VAL server (e.g., the VAE server shown in FIG. 3, the VAL server shown in FIG. 4 and the VALVAE server shown in FIG. 5). In some exemplary embodiments, the group management server may be configured to establish group communication with a group management client (e.g., the group management client shown in FIG. 4, and the SEAL group management client shown in FIG. 5).

According to the exemplary method 630 illustrated in FIG. 6C, the group management server may receive dynamic information for a group of communication devices from a group management client (e.g., a SEAL client, etc.), as shown in block 632. Then the group management server may transmit the dynamic information for the group of communication devices to a VAL server (e.g., the VAL server as described with respect to FIG. 6A), as shown in block 634.

In accordance with an exemplary embodiment, the dynamic information for the group of communication devices received by the group management server may comprise at least one of:

a VAL group identifier of the group of communication devices;

a list of identifiers of one or more members newly joined the group of communication devices; and a list of identifiers of one or more members newly left the group of communication devices.

In accordance with an exemplary embodiment, the group management server may transmit the dynamic information for the group of communication devices, e.g., in the form of the first dynamic information as described with respect to FIGS. 6A-6B, to the VAL server.

In accordance with an exemplary embodiment, the group management server may configure the group of communication devices, in response to receiving a configuration request (e.g., a configure VAL group request) for the group of communication devices from the VAL server. The configuration request may include a group identifier for a proximity-based service (e.g., a ProSe Layer-2 group ID, etc.) assigned to the group of communication devices. Optionally, the configuration request may further include information about an end point to which a notification related to the group of communication devices is to be sent.

In accordance with an exemplary embodiment, the configuration of the group of communication devices by the group management server may comprise: performing dynamic configuration of the group of communication devices, according to the configuration request received from the VAL server; and transmitting a response to the configuration request to the VAL server.

In accordance with an exemplary embodiment, the group management server may provide the group management client with the group identifier for the proximity-based service assigned to the group of communication devices (e.g., by an information flow "push ProSe Layer-2 group ID mapping").

FIG. 6D is a flowchart illustrating a method 640 according to some embodiments of the present disclosure. The method 640 illustrated in FIG. 6D may be performed by a group management client or an apparatus communicatively coupled to the group management client. In accordance with an exemplary embodiment, the group management client may comprise a SEAL client or any other functional client entity which may be configured to support SEAL group management capabilities. The group management client (e.g., the group management client shown in FIG. 4 and the SEAL group management server shown in FIG. 5) may obtain group information by communicating with a group management server (e.g., the group management servers shown in FIGS. 3-4, and the SEAL group management server shown in FIG. 5). In accordance with an exemplary embodiment, the group management client may be implemented on a terminal device. In accordance with another exemplary embodiment, a terminal device (e.g., a UE, a MS, etc.) may be configured to operate or act as the group management client.

According to the exemplary method 640 illustrated in FIG. 6D, the group management client may determine a group identifier for a proximity-based service (e.g., a ProSe Layer-2 group ID, etc.) assigned to a group of communication devices, as shown in block 642. According to the group identifier for the proximity-based service assigned to the group of communication devices, the group management client may transmit dynamic information for the group of communication devices to a group management server (e.g., the group management server as described respect to FIG. 6C), as shown in block 644. In accordance with an exemplary embodiment, the group identifier for the proximity-based service assigned to the group of communication devices may be received from the group management server by the group management client.

It can be appreciated that the dynamic information for the group of communication devices as described with respect to FIG. 6D may correspond to the dynamic information for the group of communication devices as described with respect to FIG. 6C, and thus may have the same information element(s).

In accordance with some exemplary embodiments, the group management client may announce group information to another group management client, e.g., by sending the group information from the group management client to the another group management client. The group information sent or announced by the group management client may include the group identifier for the proximity-based service assigned to the group of communication devices. Based at least in part on the group identifier for the proximity-based service, the members of the group of communication devices may communicate with each other over PC5 interface.

It can be appreciated that the VAL server as described with respect to FIG. 6A, the application specific server as described with respect to FIG. 6B and the group management server as described with respect to FIG. 6C may be implemented as separated functional logics or entities, and may be located at the same network node or different network nodes (e.g., base stations, APs or other suitable types of network elements). It also can be appreciated that the group management client as described with respect to FIG. 6D may be implemented as a functional logic or entity at a terminal device (e.g., a UE, a MS or other types of user devices).

The proposed solution according to one or more exemplary embodiments can enable a V2X application specific server to get dynamic group information (e.g., a notification about group membership) for a group of V2X UEs. Some exemplary embodiments propose APIs and procedures for notification about group membership (e.g., UEs joining and leaving the group during dynamic group operation), from a V2X UE to a VAE server and up to the V2X application specific server. According to an exemplary embodiment, the VAE_V2X_Dynamic_Group API may be updated by using information about an end point to which an identity update notification for a dynamic group may be sent. Alternatively or additionally, APIs for dynamic group creation between the V2X application-specific server and the VAE server may be provided such that the V2X application specific server can receive a response about dynamic group creation from the VAE server. In accordance with some exemplary embodiments, the SEAL interaction may be performed in the on-network dynamic group creation procedure, and the SEAL group management procedure may be updated accordingly, for example, by adding the "push layer-2 group id mapping" operation in SEAL. According to an exemplary embodiment, the group management functionalities may be moved to SEAL between a group management server and a group management client, so as to improve dynamic group management and enhance utilization of various SEAL services.

The various blocks shown in FIGS. 6A-6D may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
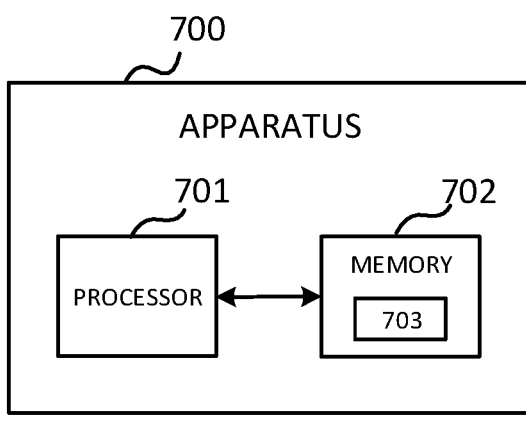
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In accordance with various implementations, the apparatus 700 may be implemented as an integrated circuit chip or module that can be plugged or installed into a VAL server as described with respect to FIG. 6A, an application specific server as described with respect to FIG. 6B, a group management server as described with respect to FIG. 6C, or a terminal device implemented with a group management client as described with respect to FIG. 6D. In such cases, the apparatus 700 may be implemented as a VAL server as described with respect to FIG. 6A, an application specific server as described with respect to FIG. 6B, a group management server as described with respect to FIG. 6C, or a terminal device implemented with a group management client as described with respect to FIG. 6D.

In some implementations, the one or more memories 702 and the computer program codes 703 may be configured to, with the one or more processors 701, cause the apparatus 700 at least to perform any operation of the method as described in connection with FIG. 6A. In some implementations, the one or more memories 702 and the computer program codes 703 may be configured to, with the one or more processors 701, cause the apparatus 700 at least to perform any operation of the method as described in connection with FIG. 6B. In some implementations, the one or more memories 702 and the computer program codes 703 may be configured to, with the one or more processors 701, cause the apparatus 700 at least to perform any operation of the method as described in connection with FIG. 6C. In other implementations, the one or more memories 702 and the computer program codes 703 may be configured to, with the one or more processors 701, cause the apparatus 700 (or a group management client on the apparatus 700) at least to perform any operation of the method as described in connection with FIG. 6D. Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8A:
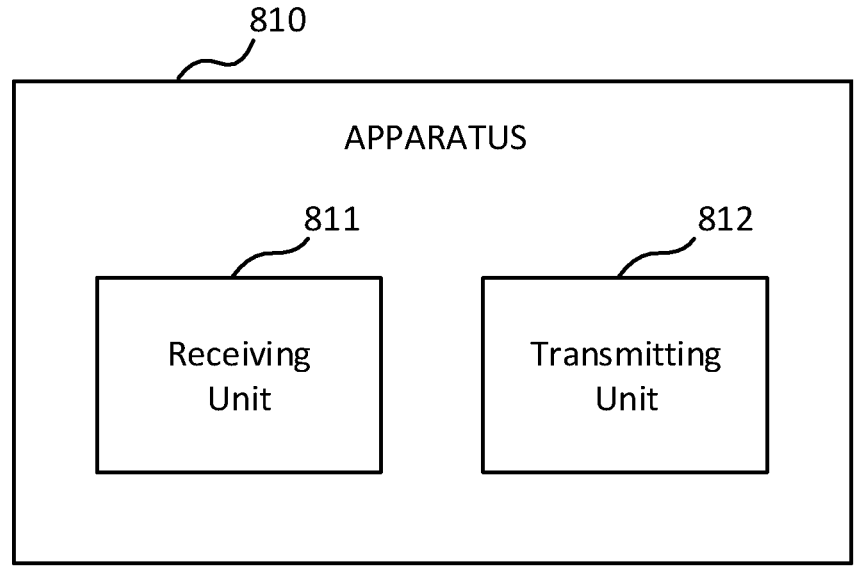
FIGS. 8A-8D are block diagrams illustrating various apparatuses according to some embodiments of the present disclosure.

FIG. 8A is a block diagram illustrating an apparatus 810 according to some embodiments of the present disclosure. As shown in FIG. 8A, the apparatus 810 may comprise a receiving unit 811 and a transmitting unit 812. In an exemplary embodiment, the apparatus 810 may be implemented in a VAL server as described with respect to FIG. 6A. The receiving unit 811 may be operable to carry out the operation in block 612, and the transmitting unit 812 may be operable to carry out the operation in block 614. Optionally, the receiving unit 811 and/or the transmitting unit 812 may be operable to carry out more or less operations to implement the proposed methods according to the exemplary embodiments of the present disclosure.

Figure 8B:
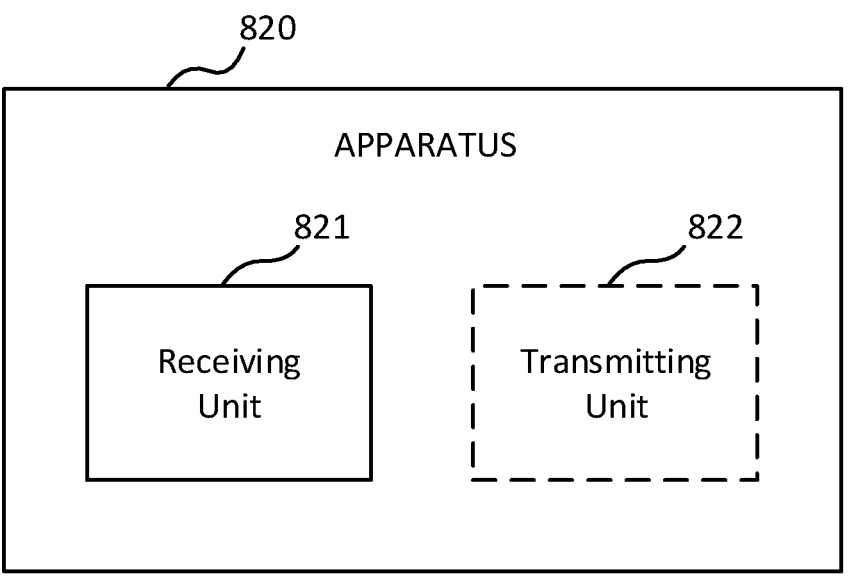

FIG. 8B is a block diagram illustrating an apparatus 820 according to some embodiments of the present disclosure. As shown in FIG. 8B, the apparatus 820 may comprise a receiving unit 821, and optionally a transmitting unit 822. In an exemplary embodiment, the apparatus 820 may be implemented in an application specific server as described with respect to FIG. 6B. The receiving unit 821 may be operable to carry out the operation in block 626 and optionally the operation in block 624, and the transmitting unit 822 may be operable to carry out the operation in block 622. Optionally, the receiving unit 821 and/or the transmitting unit 822 may be operable to carry out more or less operations to implement the proposed methods according to the exemplary embodiments of the present disclosure.

Figure 8C:
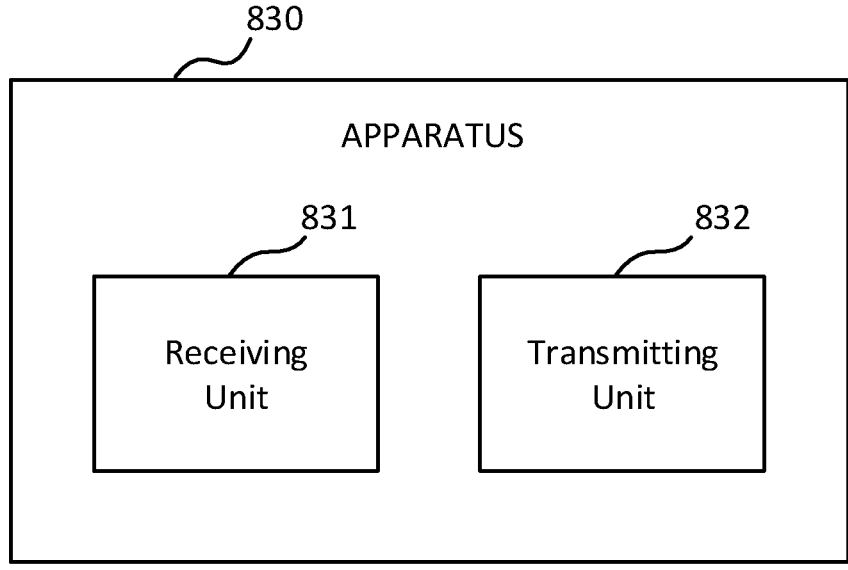

FIG. 8C is a block diagram illustrating an apparatus 830 according to some embodiments of the present disclosure. As shown in FIG. 8C, the apparatus 830 may comprise a receiving unit 831 and a transmitting unit 832. In an exemplary embodiment, the apparatus 830 may be implemented in a group management server as described with respect to FIG. 6C. The receiving unit 831 may be operable to carry out the operation in block 632, and the transmitting unit 832 may be operable to carry out the operation in block 634. Optionally, the receiving unit 831 and/or the transmitting unit 832 may be operable to carry out more or less operations to implement the proposed methods according to the exemplary embodiments of the present disclosure.

Figure 8D:
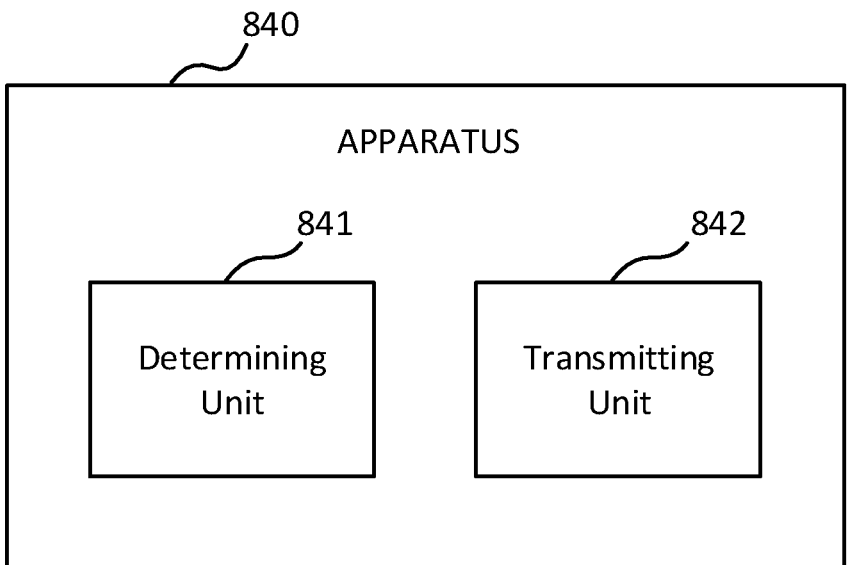

FIG. 8D is a block diagram illustrating an apparatus 840 according to some embodiments of the present disclosure. As shown in FIG. 8D, the apparatus 840 may comprise a determining unit 841 and a transmitting unit 842. In an exemplary embodiment, the apparatus 840 may be implemented in a terminal device. According to an exemplary embodiment, a group management client as described with respect to FIG. 6D may be implemented on the apparatus 840. The determining unit 841 may be operable to carry out the operation in block 642, and the transmitting unit 842 may be operable to carry out the operation in block 644. Optionally, the determining unit 841 and/or the transmitting unit 842 may be operable to carry out more or less operations to implement the proposed methods according to the exemplary embodiments of the present disclosure.

Figure 9:
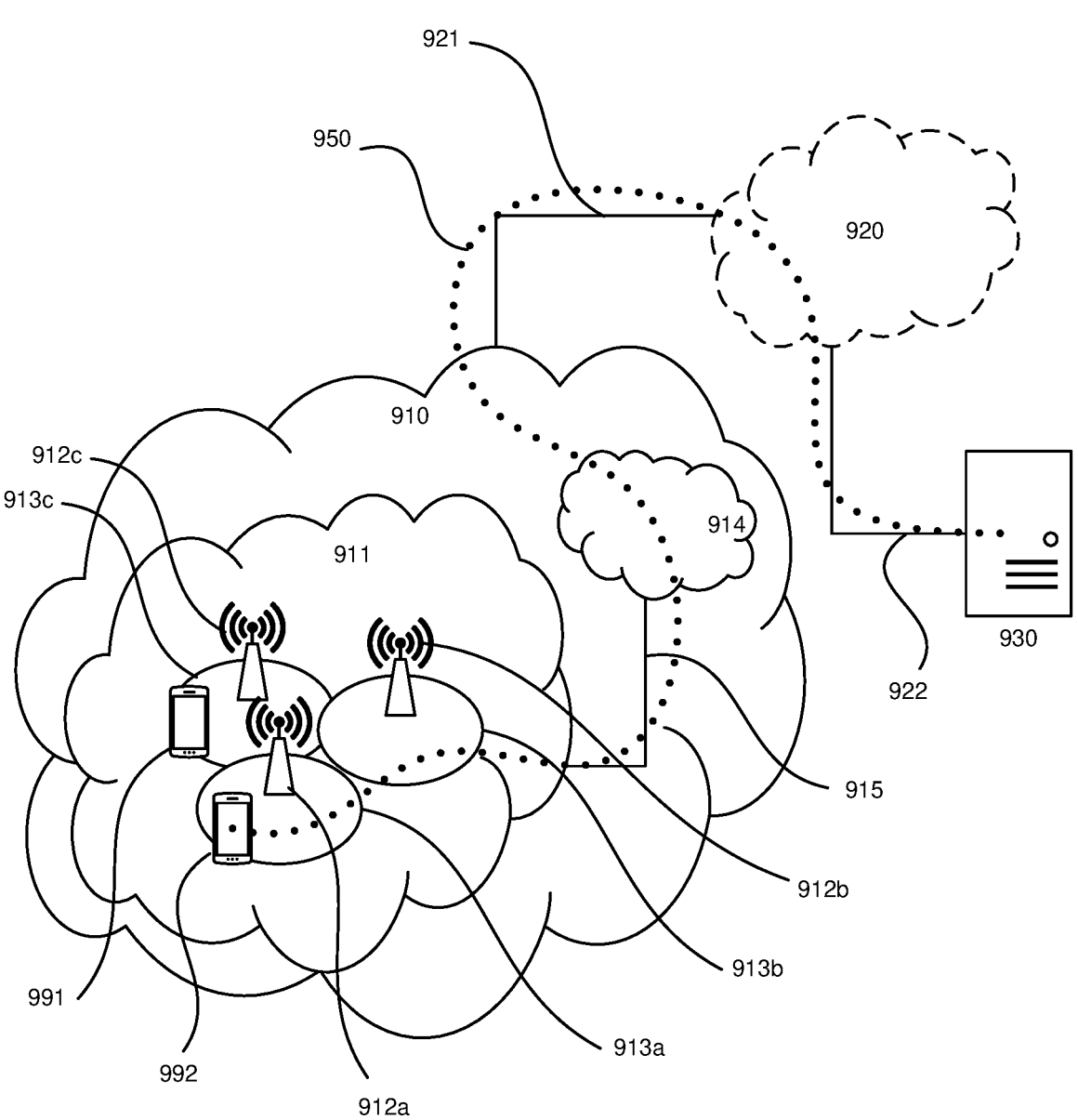
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more subnetworks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
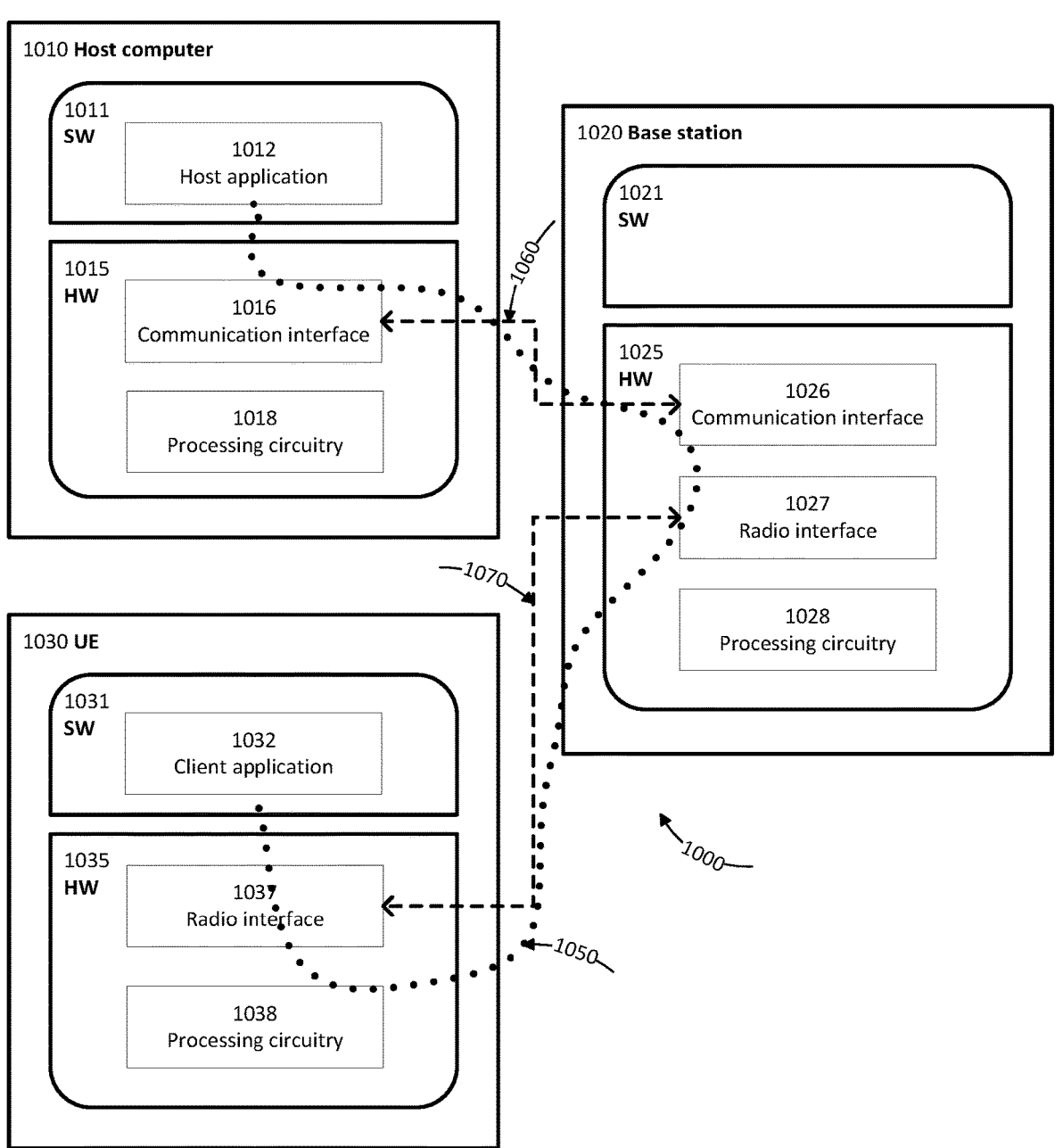
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
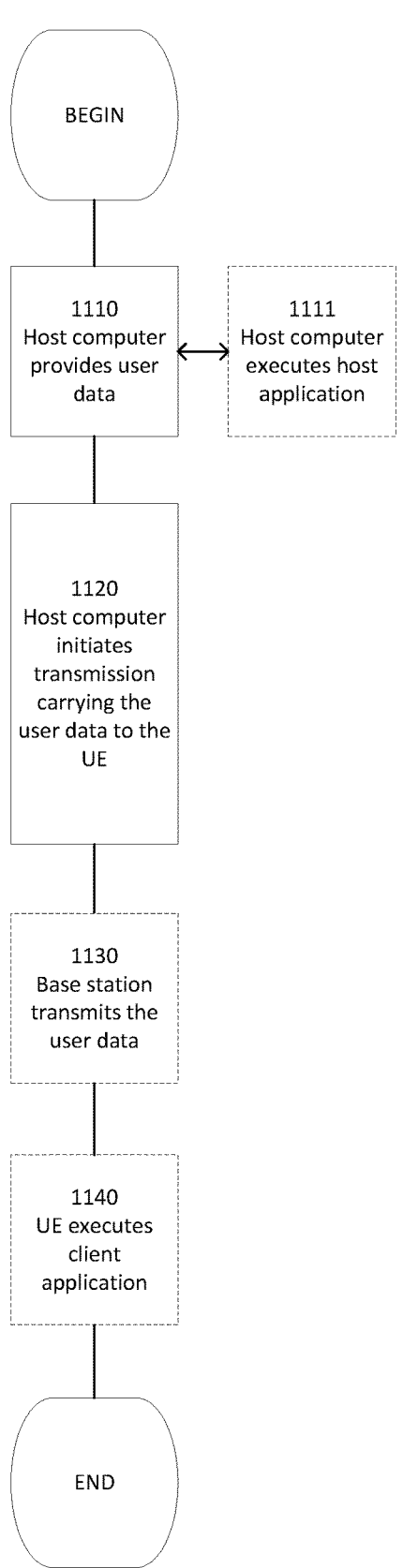
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
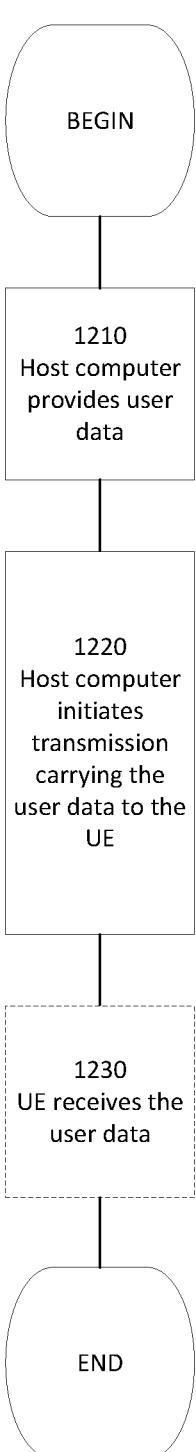
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
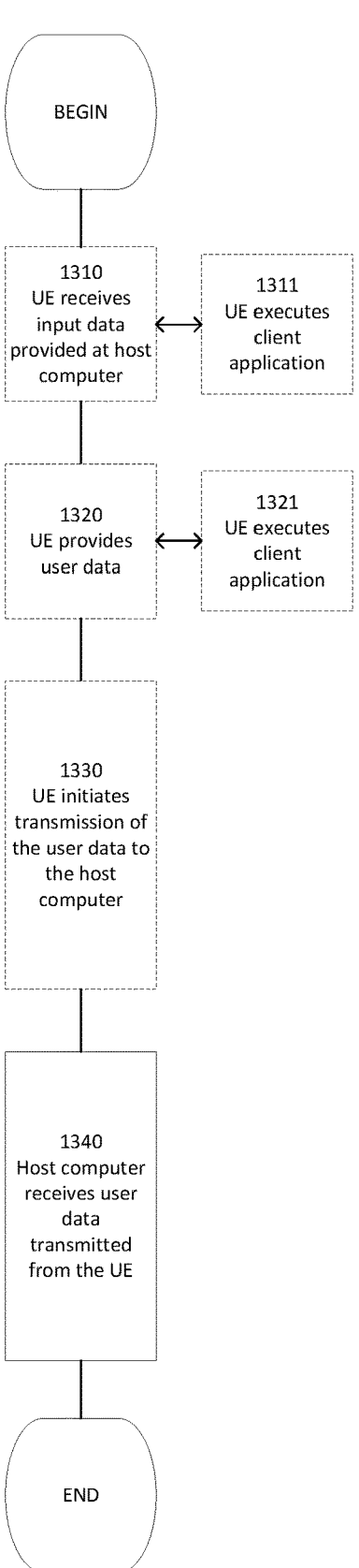
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional)

of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
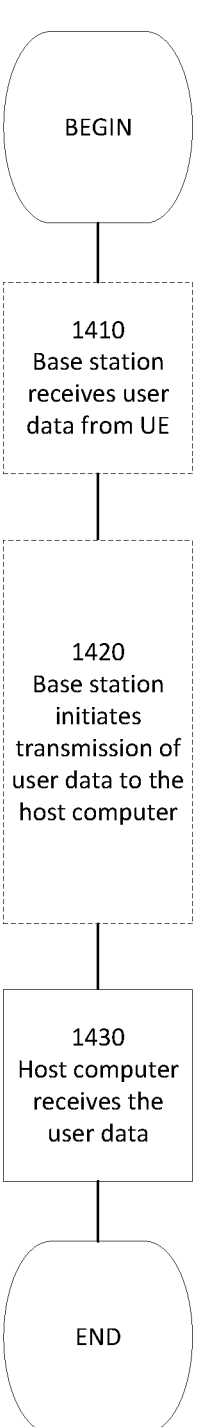
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 610 as described with respect to FIG. 6A, any step of the exemplary method 620 as described with respect to FIG. 6B, and/or any step of the exemplary method 630 as described with respect to FIG. 6C.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 610 as described with respect to FIG. 6A, any step of the exemplary method 620 as described with respect to FIG. 6B, and/or any step of the exemplary method 630 as described with respect to FIG. 6C.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 640 as described with respect to FIG. 6D.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 640 as described with respect to FIG. 6D.

According to some exemplary embodiments, there is provided a method implemented in a communication system which may include a host computer, a base station and a UE. The method may comprise, at the host computer, receiving user data transmitted to the base station from the UE which may perform any step of the exemplary method 640 as described with respect to FIG. 6D.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 640 as described with respect to FIG. 6D.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 610 as described with respect to FIG. 6A, any step of the exemplary method 620 as described with respect to FIG. 6B, and/or any step of the exemplary method 630 as described with respect to FIG. 6C.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 610 as described with respect to FIG. 6A, any step of the exemplary method 620 as described with respect to FIG. 6B, and/or any step of the exemplary method 630 as described with respect to FIG. 6C.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a vertical application layer server in a vehicle-to-everything (V2X) application, wherein the vertical application layer server is one layer of a 3-layer V2X application layer model comprised of a V2X application specific server, the vertical application layer server and a group management server which communicates with a group management client, the method comprising:

receiving first dynamic information of a group of V2X capable terminal devices from the group management server, wherein the first dynamic information of the group of V2X capable terminal devices comprises:

a V2X group identifier of the group of V2X capable terminal devices;

a list of identifiers of one or more V2X capable terminal devices newly joined the group of V2X capable terminal devices; and a list of identifiers of one or more V2X capable terminal devices newly left the group of V2X capable terminal devices; and transmitting second dynamic information of the group of V2X capable terminal devices to the V2X application specific server, wherein the second dynamic information is based on the received first dynamic information of the group of V2X capable terminal devices and wherein the second dynamic information comprises:

a dynamic group identifier of the group of V2X capable terminal devices;

the list of identifiers of the one or more V2X capable terminal devices newly joined the group of V2X capable terminal devices; and the list of identifiers of the one or more V2X capable terminal devices newly left the group of V2X capable terminal devices;

wherein the vertical application layer server is a V2X application enabler (VAE) server, and the group management server is a service enabler architecture layer for verticals (SEAL) server.

2. The method according to claim 1, wherein the group of V2X capable terminal devices is configured by the vertical application layer server, in response to:

receiving a first request for configuring the group of V2X capable terminal devices from the V2X application specific server, wherein the first request includes information about a first end point to which a notification related to the group of V2X capable terminal devices is to be sent.

3. The method according to claim 2, wherein the first end point comprises the V2X application specific server.

4. The method according to claim 2, wherein a configuration of the group of V2X capable terminal devices by the vertical application layer server comprises:

transmitting a second request for configuring the group of V2X capable terminal devices to the group management server, according to the first request received from the V2X application specific server; and receiving a response to the second request from the group management server.

5. The method according to claim 4, wherein the configuration of the group of V2X capable terminal devices by the vertical application layer server further comprises:

transmitting a response to the first request to the V2X application specific server, according to the response to the second request received from the group management server.

6. A method performed by a group management server in a vehicle-to-everything (V2X) application, wherein the group management server is one layer of a 3-layer V2X application layer model comprised of a V2X application specific server, a vertical application layer server and the group management server which communicates with a group management client, the method comprising:

transmitting first dynamic information of a group of V2X capable terminal devices to the vertical application layer server, wherein the first dynamic information of the group of V2X capable terminal devices comprises:

a V2X group identifier of the group of V2X capable terminal devices;

a list of identifiers of one or more V2X capable terminal devices newly joined the group of V2X capable terminal devices; and a list of identifiers of one or more V2X capable terminal devices newly left the group of V2X capable terminal devices; and wherein the vertical application layer server receives the first dynamic information of the group of V2X capable terminal devices and transmits second dynamic information of the group of V2X capable terminal devices to the V2X application specific server, and wherein the second dynamic information is based on the first dynamic information of the group of V2X capable terminal devices, in which the second dynamic information comprises:

a dynamic group identifier of the group of V2X capable terminal devices;

the list of identifiers of the one or more V2X capable terminal devices newly joined the group of V2X capable terminal devices; and the list of identifiers of the one or more V2X capable terminal devices newly left the group of V2X capable terminal devices;

wherein the vertical application layer server is a V2X application enabler (VAE) server, and the group management server is a service enabler architecture layer for verticals (SEAL) server.

7. The method according to claim 6, wherein the group of V2X capable terminal devices is configured by the group management server, in response to:

receiving a configuration request for the group of V2X capable terminal devices from the vertical application layer server, wherein the configuration request includes a group identifier for a proximity-based service assigned to the group of V2X capable terminal devices.

8. The method according to claim 7, wherein a configuration of the group of V2X capable terminal devices by the group management server comprises:

performing dynamic configuration of the group of V2X capable terminal devices, according to the configuration request received from the vertical application layer server; and transmitting a response to the configuration request to the vertical application layer server.

9. A terminal device in a vehicle-to-everything (V2X) application comprising:

one or more processors; and one or more memories comprising computer program codes which, when executed by the one or more processors, cause a group management client on the terminal device to:

determine a group identifier for a proximity-based service assigned to a group of V2X capable terminal devices;

transmit first dynamic information for the group of V2X capable terminal devices to a group management server, according to the group identifier for the proximity-based service assigned to the group of V2X capable terminal devices, wherein the group management server is one layer of a 3-layer V2X application layer model comprised of a V2X application specific server, a vertical application layer server and the group management server which communicates with the group management client, and wherein the first dynamic information of the group of V2X capable terminal devices comprises:

a V2X group identifier of the group of V2X capable terminal devices;

a list of identifiers of one or more V2X capable terminal devices newly joined the group of V2X capable terminal devices; and a list of identifiers of one or more V2X capable terminal devices newly left the group of V2X capable terminal devices; and wherein the group management server transmits the first dynamic information to the vertical application layer server and the vertical application layer server transmits second dynamic information of the group of V2X capable terminal devices to the V2X application specific server, and wherein the second dynamic information is based on the first dynamic information of the group of V2X capable terminal devices, in which the second dynamic information comprises:

a dynamic group identifier of the group of V2X capable terminal devices;

the list of identifiers of the one or more V2X capable terminal devices newly joined the group of V2X capable terminal devices; and the list of identifiers of the one or more V2X capable terminal devices newly left the group of V2X capable terminal devices;

wherein the group management server is a service enabler architecture layer for verticals (SEAL) server which communicates with a V2X application enabler (VAE) server.

\* \* \* \* \*